US006898436B2

(12) United States Patent
Crockett et al.

(10) Patent No.: US 6,898,436 B2
(45) Date of Patent: May 24, 2005

(54) COMMUNICATION DEVICE FOR JOINING A USER TO A GROUP CALL IN A GROUP COMMUNICATION NETWORK

(75) Inventors: Douglas M. Crockett, San Diego, CA (US); Eric C. Rosen, Solana Beach, CA (US); Mark Maggenti, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 187 days.

(21) Appl. No.: 10/076,848

(22) Filed: Feb. 14, 2002

(65) Prior Publication Data

US 2003/0153342 A1 Aug. 14, 2003

(51) Int. Cl.[7] .............................................. H04Q 7/20
(52) U.S. Cl. ...................... 455/518; 455/416; 455/521
(58) Field of Search ................................ 455/517, 518, 455/519, 520, 521, 416, 404, 515; 379/37; 709/203, 204; 370/260, 328

(56) References Cited

U.S. PATENT DOCUMENTS

| 2,240,094 A | | 4/1941 | Forman .......................... 4/217 |
| 4,649,567 A | * | 3/1987 | Childress ..................... 455/17 |
| 4,682,367 A | * | 7/1987 | Childress et al. ............. 455/17 |
| 5,426,641 A | * | 6/1995 | Afrashteh et al. .......... 370/347 |
| 5,842,136 A | * | 11/1998 | Tuulos ....................... 455/519 |
| 5,930,723 A | * | 7/1999 | Heiskari et al. ............. 455/518 |
| 6,138,030 A | * | 10/2000 | Coombes et al. ........... 455/507 |
| 6,154,645 A | * | 11/2000 | Ahlstrom et al. ........ 455/414.1 |
| 6,253,091 B1 | * | 6/2001 | Naddell et al. .............. 455/519 |
| 6,308,079 B1 | * | 10/2001 | Pan et al. .................... 455/519 |
| 6,385,461 B1 | * | 5/2002 | Raith .......................... 455/518 |
| 6,456,855 B1 | * | 9/2002 | Stosz et al. ................. 455/518 |
| 6,584,324 B1 | * | 6/2003 | Vivekanandan ............. 455/519 |
| 6,647,020 B1 | * | 11/2003 | Maher et al. ................ 370/432 |
| 6,725,053 B2 | * | 4/2004 | Rosen et al. ................ 455/518 |
| 2002/0072354 A1 | * | 6/2002 | Kundaje et al. ............ 455/416 |
| 2002/0102999 A1 | * | 8/2002 | Maggenti et al. ........... 455/518 |
| 2002/0151321 A1 | * | 10/2002 | Winchell et al. ............ 455/519 |
| 2003/0016632 A1 | * | 1/2003 | Refai et al. ................. 370/260 |
| 2003/0017836 A1 | * | 1/2003 | Vishwanathan et al. .... 455/517 |
| 2003/0153339 A1 | * | 8/2003 | Crockett et al. ............ 455/518 |

FOREIGN PATENT DOCUMENTS

| GB | 2281676 A | * | 3/1995 | ............ H04Q/7/22 |
| GB | 2281676 | | 8/1995 | ............ H04Q/7/22 |
| WO | 0167674 | | 9/2001 | ........... H04L/12/00 |

* cited by examiner

*Primary Examiner*—Tilahun Gesesse
(74) *Attorney, Agent, or Firm*—Philip R. Wadsworth; Robert J. O'Connell; John L. Ciccozzi

(57) ABSTRACT

A method and apparatus for joining a user to a call in a group communication network provides for receiving an indication from a user who wishes to initiate a group call and sending a request to a server to add the user to the group call if the group call is in progress. The method and apparatus also provides for receiving a response from the server indicating that the group call is in progress, alerting the user of being added to the group call, and receiving media from the server after a traffic channel is re-established. The method and apparatus also provides for a significant reduction in the actual total dormancy wakeup time and latency by exchanging group call signaling even when mobiles are dormant and no traffic channel is active.

24 Claims, 18 Drawing Sheets

COMMUNICATION DEVICE FOR JOINING A USER TO A GROUP CALL IN A GROUP COMMUNICATION NETWORK

FIELD

The present invention relates to point to multi-point communications systems. More specifically, the present invention relates to a method and apparatus for adding a user, who wishes to initiate a group call, to the group call if the group call is in progress.

BACKGROUND

A class of wireless service intended for quick, efficient, one-to-one or one-to-many (group) communication has existed in various forms for many years. In general, these services have been half-duplex, where a user presses a "push-to-talk" (PTT) button on his phone/radio to initiate speech. Pushing the button either keys his radio, in some implementations, or in a moderated system, where communications occurs via a server of some type, indicates the user's request for the "floor." If granted the floor, or talker permission, the user then generally speaks for a few seconds, after which he releases his PTT button, and other speakers can request the floor. Communication is generally from one speaker to a group of listeners, but may be one-to-one. This service has traditionally been used in applications where one person, a "dispatcher," needs to communicate to a group of people, such as field service personnel or taxi drivers, which is where the "dispatch" name for the service comes from.

Similar services have been offered on the Internet and are generally known as "voice chat." These services are usually implemented as personal computer applications that send vocoder frames in Internet protocol (IP) packets, i.e., voice-over-IP (VoIP) service, to a central group chat server, or possibly from client to client in a peer-to-peer service.

A key feature of these services is that communication is quick and spontaneous, usually initiated by simply pressing a PTT button, without going through a typical dialing and ringing sequence. Communication in this type of service is generally very short, with individual talk "spurts" being generally on the order of several seconds, and "conversations" lasting possibly a minute or less.

The time delay between when the user requests the floor and when he receives a positive or negative confirmation from the server that he has the floor and may begin speaking, which is known as the PTT latency, is a critical parameter for half-duplex group communications systems. As mentioned previously, dispatch systems place a priority on short, quick conversations, which makes the service less effective if the PTT latency becomes large.

Existing group communication infrastructures provide limited opportunities for significantly reducing the PTT latency, i.e., actual PTT latency may not be possibly reduced below the time required to re-establish traffic channels within dormant packet-data sessions. Further, talker and listeners traffic channels are brought up in series, because the only mechanism available to begin waking up a dormant group is to wait for the talker's traffic channel to be re-established to signal the server. Currently, no mechanism exists to send mobile-originated user signaling data on anything other than a traffic channel—a limitation that requires traffic channels to be re-established before any communication between clients and the server can take place.

There is a need, therefore, for mechanisms to reduce both apparent PTT latency experienced by the talker and total time required to re-establish traffic channels for participating mobiles without negatively impacting system capacity, client battery life, or other resources.

In a dispatch model, communication between endpoints takes place within virtual groups wherein the voice of one "talker" is broadcast to one or more "listeners". A single instance of this type of communication is commonly referred to as a dispatch call or simply a call. A call is an instantiation of a group, which defines the characteristics of the call and is, in essence, a member list with some associated information, such as a group name or group id. A member list is a list of one or more users that are invited to participate in the call.

There is a need for a dispatch model that supports both the chat-room model and the ad-hoc model of group call services. In the chat-room model, the groups are pre-defined, which may be stored on the dispatch server. In the ad-hoc model, however, the groups may be defined and/or modified in real-time.

SUMMARY OF THE INVENTION

The disclosed embodiments provide a novel and improved method in a communication device for adding a user to a group call in a group communication network, which includes the steps of receiving an indication from a user who wishes to initiate a group call and sending a request to a server to add the user to the group call if the group call is in progress.

In another aspect of the invention, a computer-readable medium in a communication device embodies a method for adding a user to a group call in a group communication network, the method including the above-mentioned steps.

In another aspect of the invention, a communication device for adding a user to a group call in a group communication network includes means for receiving an indication from a user who wishes to initiate a group call and means for sending a request to a server to add the user to the group call if the group call is in progress.

In another aspect of the invention, a communication device for adding a user to a group call in a group communication network includes a receiver, a transmitter, and a processor communicatively coupled to the receiver and the transmitter. The processor is capable of receiving an indication from a user who wishes to initiate a group call and sending a request to a server to add the user to the group call if the group call is in progress. In one aspect, the communication device is a push-to-talk (PTT) device.

BRIEF DESCRIPTION OF THE DRAWINGS

The features and advantages of the present invention will become more apparent from the detailed description set forth below when taken in conjunction with the drawings in which like reference characters identify correspondingly throughout and wherein.

DETAILED DESCRIPTION

Figure 1:
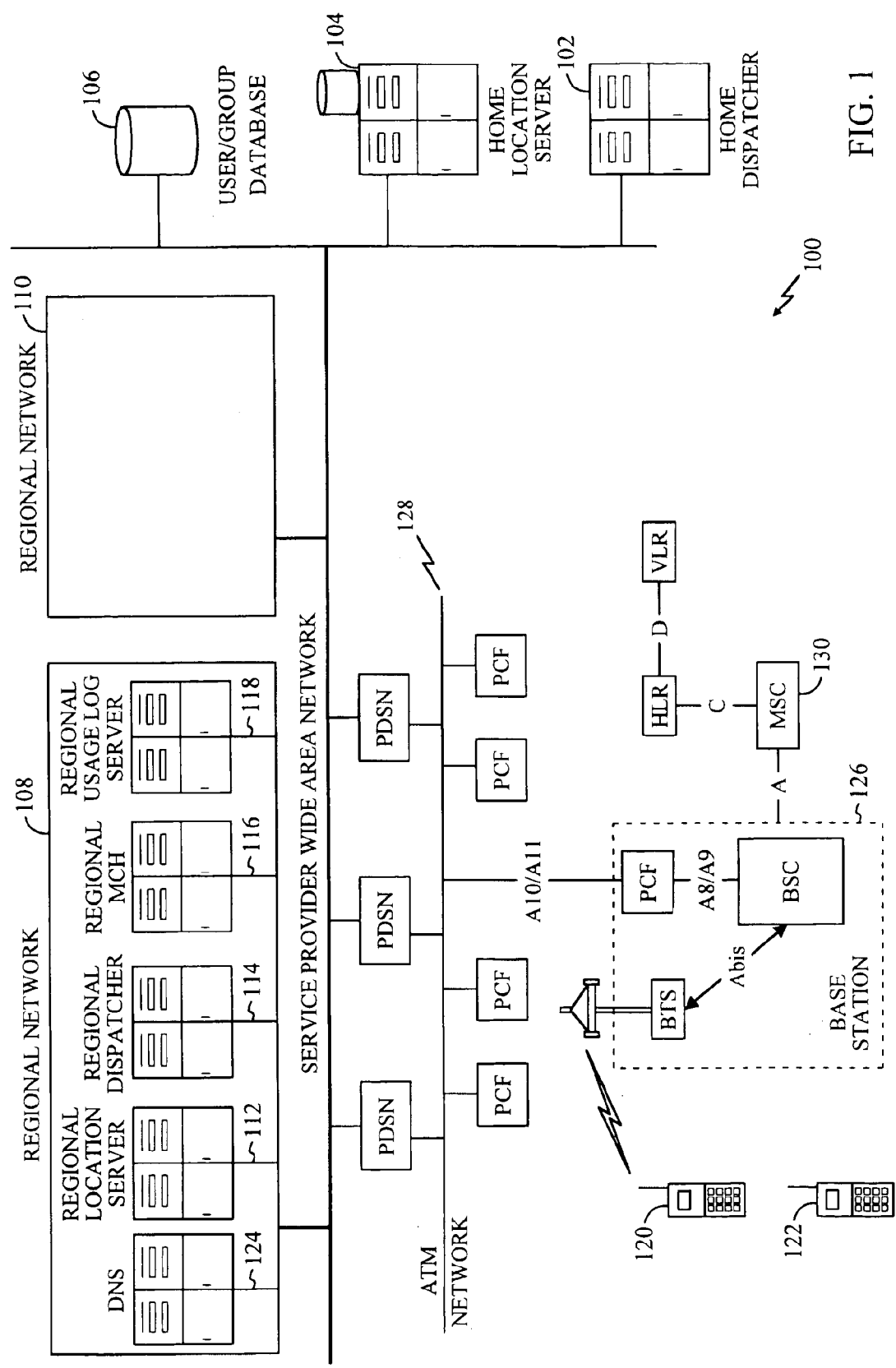
FIG. 1 illustrates a group communications system.

Before one embodiment of the invention is explained in detail, it is to be understood that the invention is not limited in its application to the details of the construction and the arrangement of the components set forth in the following description or illustrated in the drawings. The invention is capable of being implemented in other embodiments and are carried out in various ways. Also, it is understood that the phraseology and terminology used herein is for purpose of description and should not be regarded as limiting.

FIG. 1 illustrates an exemplary functional block diagram of a group communication system 100. The group communication system 100 is also known as a push-to-talk (PTT) system, a net broadcast service (NBS), a dispatch system, or a point-to-multi-point communication system. In one embodiment, the group communication system 100 includes application server components, such as dispatchers, location servers, media control unit (MCU) complexes, usage log servers and Internet protocol (IP) clients (wireless and/or wireline devices with IP connectivity). The application server components may be deployed in either a centralized deployment or a regionalized deployment, based on the component's functionality. The centralized deployment may include a home dispatcher (HD) 102, a home location server (HLS) 104, and a user/group database 106. These components may be centrally located in the service provider's network and may be accessible by the regional deployments. The centralized components may be used in locating the roaming users and in initiating inter-regional group calls. A regionalized deployment 108, 110 may include a regional location server (RLS) 112, a regional dispatcher (RD) 114, a regional media control unit (MCU) complex 116, and a regional usage log server (ULS) 118.

The regional deployments may be distributed across the service provider's network to ensure the network delays associated with call setup are kept at a minimum, for the purpose of satisfying instant-response requirement. Distributing the call load across several regionalized systems also ensures that adequate scalability schemes can be developed to support large number of users. The regionalized application server components provide user registration, intra-regional call setup and management, and alert initiation and delivery for the users, which are registered in the region.

The group communication devices (clients) 120, 122, which may be deployed on a cdma2000 handset, for example, requests a packet data session using a standard data service option and uses this session to register its IP address with the application server and to perform group call initiations. In one embodiment, the application server components 108, 110 are connected to the service provider's packet data service nodes (PDSNs). Clients 120 and 122, upon requesting a packet data session from the wireless infrastructure, have IP connectivity to the application server components 108, 110 through the PDSNs.

Upon power-up, clients 120, 122 may request a packet data session using the data service option. As part of the establishment of the packet data session, the client is assigned an IP address. At this time, the client also receives the address of a domain name service (DNS) server 124. The client 120, 122 queries the DNS server 124, e.g., by using a service record (SRV) lookup, to find the address of RLS 112. After locating RLS 112, the client 120, 122 may perform a registration, notifying the application server of its location information, e.g., IP address. The registration may be performed using an IP protocol, such as session initiation protocol (SIP) over user datagram protocol (UDP). The IP address of the client 120, 122 may be used to contact the client when the user is invited into a group call.

In one embodiment, after the registration is complete, the client may perform another DNS SRV record lookup to find the address of regional dispatcher 114. The client contacts regional dispatcher whenever the user requests to start a call or sends an alert. The interface between regional dispatcher 114 and client 120, 124 may be signaling protocol over UDP.

Once a group call is established, client 120, 114 and MCU complex 116 exchange media and signaling messages. In one embodiment, the media may be sent between the call participants and MCU complex 116 using real-time protocol (RTP) over UDP. The signaling messages may be also signaling protocol over UDP. These protocols and the functionality they provide are described later.

Components

The group communication system 100 may include the IP endpoints that contain the client software and regionalized and centralized server components that are required to offer the group communication service. The group communication clients and the application server components are described in more detail in the following sections.

Clients

The group communication client 120, 122 may run on any IP endpoint that have access to the appropriate vocoder(s). The IP endpoints may include applications running on a wireless system, e.g., cdma2000, an application development platform, e.g., binary runtime environment for wireless (BREW), and personal computers.

Figure 2:
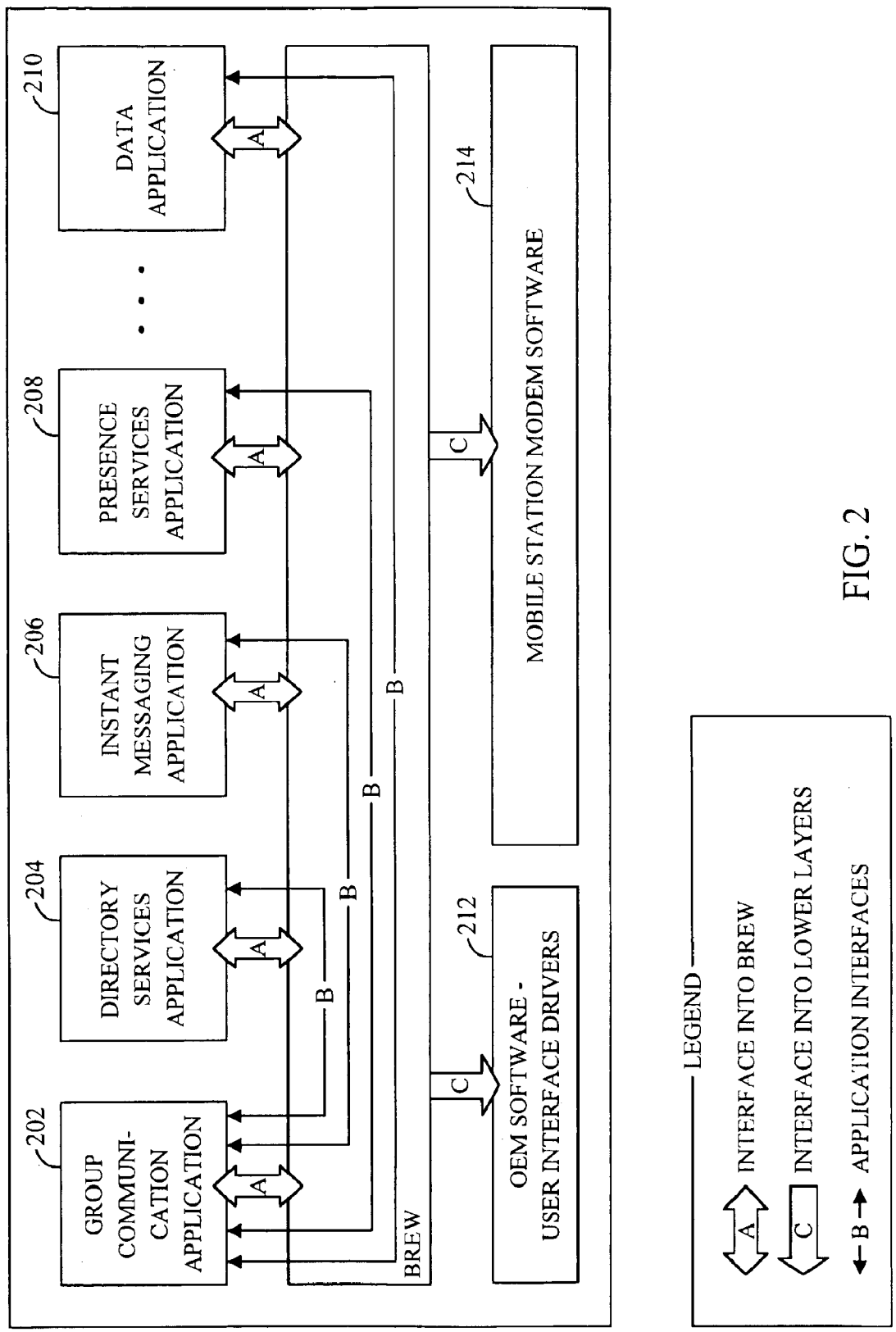
FIG. 2 illustrates how several applications interact with each other.

The client may include a software application, which may be developed using BREW, and interfaces to the mobile station modem software (MSM), which may be downloaded to the client that contains the BREW environment. BREW is a platform that allows developers to create applications that may operate on client communication devices. BREW provides an isolation layer to the application developer, enabling the development of applications without having direct contact into the MSM software and the original equipment manufacturer (OEM) software. This allows the applications to be developed rapidly and to evolve independent of the MSM and/or OEM software. It also enables applications to be downloaded on any device containing the BREW environment. As shown in FIG. 2, the client group communication application software 202 may execute in parallel with other applications 204, 206, 208, 210. While these services may be directly offered through the OEM 212 and MSM 214 interfaces, BREW provides isolation from modifications made by the application in these layers. This allows the OEM 212 and MSM 214 to evolve separately from the data applications 202, 204, 206, 208, 210.

In order for the client to operate effectively on a personal computer, the personal computer may include access to a compatible vocoder, access to sound drivers, and IP connectivity to application servers.

Location Server

In one embodiment, the location server (LS) may accept and/or maintain user location information, e.g., the network-level IP address, the physical location of the user, such as longitude and latitude, and/or packet zone id, i.e. a system identifier broadcast over-the-air on forward common channels which identifies the scope of the PDSN which is providing packet-data service for that sector. In one embodiment, the LS may include a component that processes registrations from the clients and supplies user location information to other applications, such as instant messaging, using an SIP-interface.

The LS may include two functional elements, the regional location server (RLS) 112 and the home location server (HLS) 104. RLS 112 may be deployed on a region-by-region basis and the BLS 104 may be centralized. The details of these elements and their functions are described below.

Regional Location Server

The RLS 112 may process and maintain registrations from clients located within its region. In one embodiment, RLS 112 is a standard SIP-based LS, with associated storage for the user location information. As part of the maintenance of the registration entries, RLS 112 may check the expiration date, "expiry" fields, for each registration. The RLS ensures the expired entries are removed, and both the regional dispatcher (RD) and the HLS are notified of the removed entries.

As discussed previously, the clients may perform an IP registration in order to notify the application server of their location. The clients may maintain their registrations for the duration of their availability to the group communication service. The clients may perform re-registrations when the client's IP address changes and when the registration is about to expire.

When the client registers or re-registers, the RLS 112 may notify its associated RD 114.

This allows RD 114 to pre-load user data in preparation for call setup requests, thus reducing call setup time. The RD 114 may cache the user's location information, eliminating the need for RD 114 to contact the RLS to retrieve user location information during call setup.

The RLS 112 may notify RD 114 in the event the user's location information is updated or removed from RLS 112. This ensures RLS 112 and RD 114 remain in sync with the latest information on users registered within the region.

The RLS 112 may also periodically update ILS 104 with registered users' location information. In the event the RLS 112 submits a registration to BLS 104 for a user that already has a valid registration in another region, the BLS may resolve the conflict.

Home Location Server

The HLS 104 may process queries for user location information. In one embodiment, BLS 104 provides a SIP-based interface to allow other applications, such as instant messaging application, to query the location information for a particular user.

If HLS 104 is a centralized component and the RLSs communicate with it, the HLS may resolve multiple registrations in different regions for roaming users. The HLS 104 may receive registration information from each of the RLSs. If HLS 104 receives multiple registrations for the same user, the HLS 104 may keep the most recent registration and request removal of the stale registration(s) for the user from the RLSs. This in turn may trigger the removal of cached information for that user from RD 114 associated with the RLS that contains the stale registration.

Dispatcher

The dispatcher may facilitate call setup by locating users and assigning group calls to media control units (MCU) complex 116. The dispatcher is the server component that is key to meeting the "instant access" requirement. To ensure the lowest call setup times, the dispatcher may include two functional elements with similar structure and functionality, but have different deployment strategies. These two elements, regional dispatcher (RD) 114 and home dispatcher (HD)) 102, are described in detail in the following sections.

Regional Dispatcher

The RD 114 may be the initial point of contact for the call setup requests and alert requests. RD 114 may pre-load user information when it receives an indication from RLS 112 that a user has registered. Along with the user information, RD 114 may cache information about group calls, which are running in the system. RD 114 may use the cached information for users and groups during call setup to keep the setup time at a minimum, i.e., no database lookups may be required.

In one embodiment, the group information the RD stores in the cache includes the group member list and the address of the MCU complex 116 on which the group is running. The RD 114 may maintain the member list and MCU address for the life of the call. This helps RD 114 quickly determine if an incoming call request contains a group definition, which is identical to one that has an associated call already running in the system, which allows the RD to quickly respond to call setup requests and confidently grant or deny the "floor" request in the response.

The RD 114 may grant or deny the floor-control request. The RD 114 may decide whether it will request MCU complex 116 to add the user to the call as a "late-join" participant or to start a new call with the associated member list.

During call-setup request processing, RD 114 may use the cached user information to retrieve location information for the users specified in the call setup request. If a user cannot be located, RD 114 may request HD 102 to locate the user. In one embodiment, if at least one or more target users are located, RD 114 continues with the call setup. After the targets have been located, RD 114 may decide to which MCU the call should be assigned. This determination may be based on the IP addresses of the users in the group, including the originator.

The RD 114 may handle alert requests similar to call requests. In one embodiment, the alert request is assigned to local MCU complex 116 for processing, regardless of the location of the targets.

In one embodiment, the information in the RD's cache may be periodically written to a reliable storage mechanism so that it may be recovered in the event of a failure. Upon recovery of the RD failure, the user and group information that was written to the reliable storage mechanism may be re-loaded into cache and the RD proceeds to validate the cached information in conjunction with processing incoming call setup requests.

In one embodiment, RD 114 loads the user data into local cache upon each user registration notification from RLS 112. By eliminating the need to do several database lookups at call setup time, RD 114 significantly reduces the amount of time it takes to validate and respond to call setup requests or alert requests.

The RD 114 may access the user/group database 106 during call setup to expand pre-defined group addresses, if present in the request, to lists of individual users and, if necessary, to translate alternate identifiers of users or groups, e.g., telephone numbers, conference IDs, to canonical address(es).

Home Dispatcher

Home dispatcher (HD) 102 may track the registered users' location information. The HD may contain location information for the users that have performed registrations with RLS 112.

As discussed previously, each RLS 112 may notify its associated RD 114 every time a user registration, re-registration, un-registration, or registration expiration occurs. RD 114 may use this information to load or release user information in its local cache. Each RD 114 may update the HD 102 with the user location information. Since the HD 102 receives updates from RD 114, HD 114 may assist in finding users that are spread out geographically across different regions. RD 114 may request assistance from HD 102 when it receives a request for a user that is not currently registered within the region, i.e., not in the RD's cache of user information.

DNS Server

In one embodiment, the group communication system 100 may use the service provider's DNS server 124 to provide location information for RLS 112 and RD 114 to the clients. This information may be configured upon each regional deployment and updated periodically to ensure its accuracy.

In one embodiment, each client learns the DNS server's address through Internet protocol control protocol (IPCP) negotiation during point-to-point protocol (PPP) session establishment, when it asks for a packet data session. DNS server 124 may be advertised in this fashion on a region-by-region basis. This allows the client to roam from region to region and communicate with DNS server 124 in the same region in which the client is located. DNS server 124 is deployed on a region-by-region basis, in conjunction with each PDSN. In one embodiment, the DNS server 124 may be updated with each RD 124 and RLS that is servicing the PDSN with which the DNS server 124 is associated.

In one embodiment, the mechanism used to locate the appropriate RD 114 and RLS 112 is based on a combination of DNS and SIP addressing. DNS service (SRV) record lookup may be performed based on the "<domain>" portion of the SIP URI under which the client registers. The SRV record request may include the protocol or service, which the requestor is attempting to find. For example, in the case of attempting to locate the RLS 112, the client may request a "registration service" in the DNS SRV record lookup. The DNS response may include one or more valid network and port addresses for the server, which offers the requested service. DNS server 124 may be used in load balancing between servers that offer the same service, by allowing DNS server 124 to round-robin between the multiple server when returning answers to client requests.

User/Group Database

In one embodiment, the user/group database 106 is the central repository for the users and group information. For each user, the database may include information such as user address, pre-emption rank, authentication information, user contact information, and lawful intercept flag, which indicates if the user is under surveillance. The database may also include definitions of pre-defined groups, which are lists of users and an associated group name, for chat-room model of dispatch services. Each group may be uniquely identified by the group address, for example. The client may use the group address to identify the group in the group call setup request. The RD 14 may use the group address to retrieve the associated member list from user/group database 106 when it receives a group call setup request with a pre-defined group in it.

Media Control Unit Complex

The media control unit (MCU) complex may include media control hosts (MCH) and media control unit (MCU). The MCH may host and manage multiple MCU processes. Each MCU may handle the real-time signaling and media processing for a single call. The functions the MCU performs for a call may include:

Handling call assignments from RD 114

Sending loading and status information to the MCH

Sending call initiation information to clients

Processing in-call signaling from the clients, such as PTT requests

Ensuring signaling messages are delivered to the clients reliably

Replicating and distributing media for "one-to-many" calls

Providing media translation using the appropriate transcoder for "mixed" vocoder "one-to-many" calls Monitoring call activity and initiating call termination based on media flow inactivity Producing usage information for usage log server (ULS) 118

Forwarding media and signaling information to the appropriate lawful intercept point when requested.

The MCU may process alert requests from RD 114, send out alert notifications to the client, and wait for acknowledgements from the clients. Upon receipt of acknowledgements from the targets, the MCU releases any resources assigned to the alert transaction. At this time, the MCU may handle other call assignments or alert requests.

Usage Log Server

The ULS 118 may exist in every region and may be co-located with the MCU complex 116. ULS 118 may collect usage events from MCU complex 116 for each call or alert processing, format them into a usage data record (UDR), and then store these UDRs in a sequence of UDR files. The UDRs for calls may contain information regarding individual calls including the list of participants and participant usage totals. The UDR for alerts may contain information that indicates the originator of the alert and the target users to whom the alert was sent. The UDR files may be collected by the service provider for billing analysis, and may be deleted after a fixed amount of time.

ULS 118 may write a single UDR per call instance at the end of each call. The ULS 118 may also write a single UDR for each time an alert request is processed. UDRs written by the ULS 118 may contain the following information:

Call instance identifier or alert instance identifier

MCU identifier, which also implies call location. At the start of a call, an appropriate MCU may be chosen based on the registered location of all the proposed participants. The location of the MCU may or may not be in the same region as the originator.

Start time of the call or alert

End time of the call or alert

Originating user name and/or identifier

Originating user IP address

For each participant, username, user address, user IP address, cumulative participation time, which may be zero for alerts, and total number of seconds the participant held the floor, which may be zero for alerts.

In one embodiment, for each call a single UDR is issued, which may represent the total collection of talk segments during the call. If UDR event logging is required on a per talk segment basis, it may be implemented at the expense of additional processing load, file I/O, and disk space requirements.

The group communication system 100 performs several different functions in order to operate the group services. The functions relating to user experiences include registration, call initiation, call termination, sending alerts, late join, talker arbitration, adding users, removing members, un-registering, addressing, and authentication. The functions relating to system preparation and operation include administration and provisioning, scalability, and reliability. These functions are described in detail in the following sections.

Registration

In a wireless communication system, e.g., CDMA system, registration is the process by which a mobile station makes its location known to the wireless system infrastructure. This location information may include the geographical area the mobile station is in and the identification of the base station that is serving the mobile station, which may be used to aid in the efficient use of the paging and access channels.

In one embodiment, the user location information is the IP address of the client, regardless of whether the client is connected via wireless or wireline services. An exemplary IP protocol that enables IP applications to locate clients based on their IP address is the session initiation protocol (SIP). Among other functions, SIP provides methods for clients to register their IP address and other location information with a SIP server component. In addition, SIP provides methods for IP applications interested in "finding" clients to query the same SIP server component for location information, such as the client's IP address.

Registration may include the process of an IP client communicating with a SIP server component to notify and maintain its location information, e.g., IP address. The SIP server component that provides this functionality is the location server. The method by which a client notifies the location server of its location or changes to its location is the SIP REGISTER method.

Figure 3:
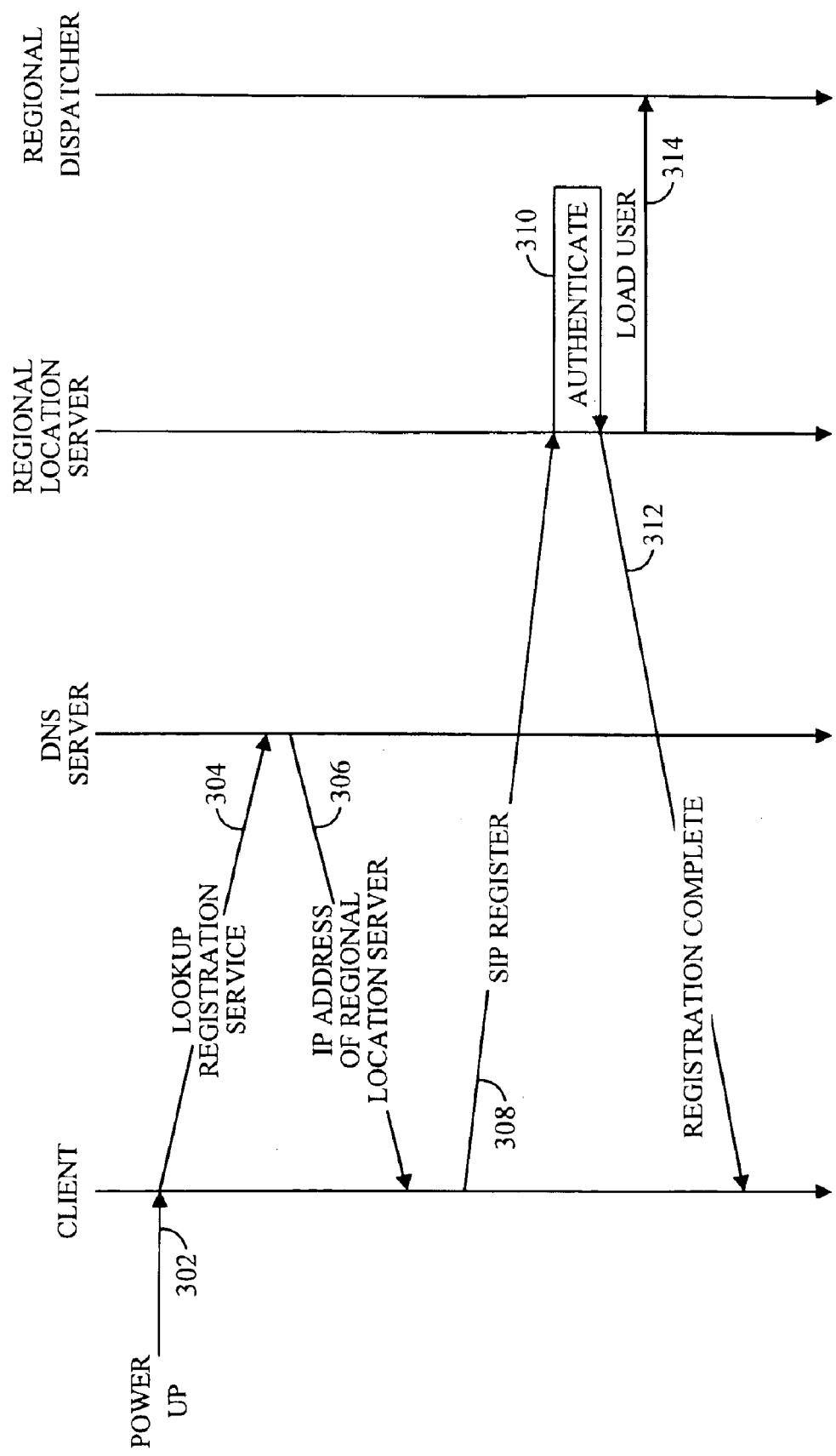
FIG. 3 illustrates an exemplary user-registration process according to one embodiment.

In one embodiment, the clients register their location information with a regional location server. Other IP based applications, such as instant messaging, may benefit from having knowledge of each client's IP address available in a location server. An external service or the client may perform the registration. FIG. 3 illustrates an exemplary call flow for performing the registration function.

Upon power-up 302, the client may request a packet data session and start the process of registering its IP address with RLS 112. In order to perform the registration, the client may perform a DNS SRV record lookup 304 to determine the address of the RLS. Once the RLS address has been retrieved 306, the client may register its location information, e.g., by using a SIP registration message 308. The RLS may authenticate 310 the user and issue a response 312 to the client. The RLS may notify 314 the regional dispatcher that the user has registered, and the regional dispatcher may use this information to pre-load the user's associated data record in order to facilitate a faster response time during call setup. At this point, the client may be contacted with an invitation to participate in a group call. In one embodiment, clients may need to perform registration in order to receive a group call, regardless of the type of data connectivity they have, i.e. wireless or wireline.

Registrations may have an "expiry" field associated with them, which indicates how long the client's registration information may be considered valid. In order to guarantee the client is always reachable via IP, the client may be aware of the expiration of its registration and perform a re-registration prior to the time of expiration. Registrations may also become invalid or stale due to other circumstances, such as when the client's IP address is changed or the data connection between the client and the location server is severed. The clients may be aware of the state of their data connectivity and whether their IP address has changed.

After the initial registration has been completed, a client may allow its packet data session to go dormant, which may release the dedicated traffic channel. The client may monitor its packet data session to ensure that it remains valid during periods of extended dormancy. Conditions that may affect the validity of the session include moving to an area with a different packet zone ID, experiencing a fade or loss of service, and accepting and/or placing a PSTN call. The client's IP address may change and the client may be required to re-establish data connectivity to the infrastructure. When the client re-establishes its packet data session, it receives a new IP address. The new IP address needs to be communicated to the location server to ensure the client's location information remains accurate. This may be accomplished by performing a re-registration.

A wireline client that is communicating to the location server through a firewall, may need to maintain the opening through the firewall by periodically "pinging" the location server. This is accomplished by performing re-registrations.

Group Call Initiation

After registration is complete, the user may make or receive calls. Before the initiation of the first call after power-up, the client may perform a DNS SRV record lookup to find the location of the regional dispatcher. This may be performed as part of the start-up process.

A "group" is associated with an originator, the user who initiated the group setup, and a member list, which contains the target user or users. The member list may contain one or more users, one or more pre-defined groups, or a combination of the two. If the member list contains only one user, the call initiated using that member list is commonly referred to as a private call. If the member list contains any pre-defined groups, the regional dispatcher may expand the pre-defined groups into a list of one or more target users, e.g., by replacing the pre-defined group identifier in the original member list, with the pre-defined group's associated member list. After the pre-defined groups have been expanded, the resulting member list may contain only target user names. At this point, the regional dispatcher attempts to locate the target users in the member list, e.g., by scanning the regional dispatcher's cache of user information. If the targets are located within the regional dispatcher's cache, the members of the group may be registered within the same region as the regional dispatcher. This type of group call is labeled an "intra-regional" call. If there are users which the regional dispatcher was unable to locate, the regional dispatcher may request assistance from the home dispatcher to locate the users. The call associated with a group that contains members from two or more regions is referred to as an "inter-regional" call.

After the regional dispatcher has determined whether the call is intra-regional or inter-regional it may start the process of determining which media control unit (MCU) may host the call. For intra-regional calls, the regional dispatcher may assign the call to an MCU located in the same region as the regional dispatcher, if there are MCU resources available in that region. The resulting call using this type of call setup is referred to as a "locally-hosted" call, or local call. For inter-regional calls, the regional dispatcher may have a choice to assign the call to an MCU within the same region or in a remote or foreign region. The regional dispatcher may make this decision based on the users' location information to find the optimal path of travel for the IP packets containing media and signaling. If a majority of the users are located in a particular region, the call may be assigned to that region. If the users are evenly dispersed across regions, the call may be assigned to one of the regions containing the target users. If the inter-regional call is assigned to an MCU in different region then the region in which the regional dispatcher resides, the call is referred to as a "remotely-hosted" or remote call. The regional dispatcher may have knowledge of the network topology and/or connectivity between the MCUs and the PDSNs they are serving and may use this knowledge to make a better decision on the assignment of calls.

Intra-regional Calls

The group communications system 100 may be deployed to ensure the majority of the calls are intra-regional. Intra-regional calls may eliminate the need for communication between regional dispatcher 114 and home dispatcher 102 at call setup time. The need for communication between the regions may also be eliminated when the targets are in the same region and the call is being hosted locally, as is the case for the majority of intra-regional calls. The following sections describe call flows, timing estimates, and messaging schemes for intra-regional calls.

Initiating a Local Call

Figure 4:
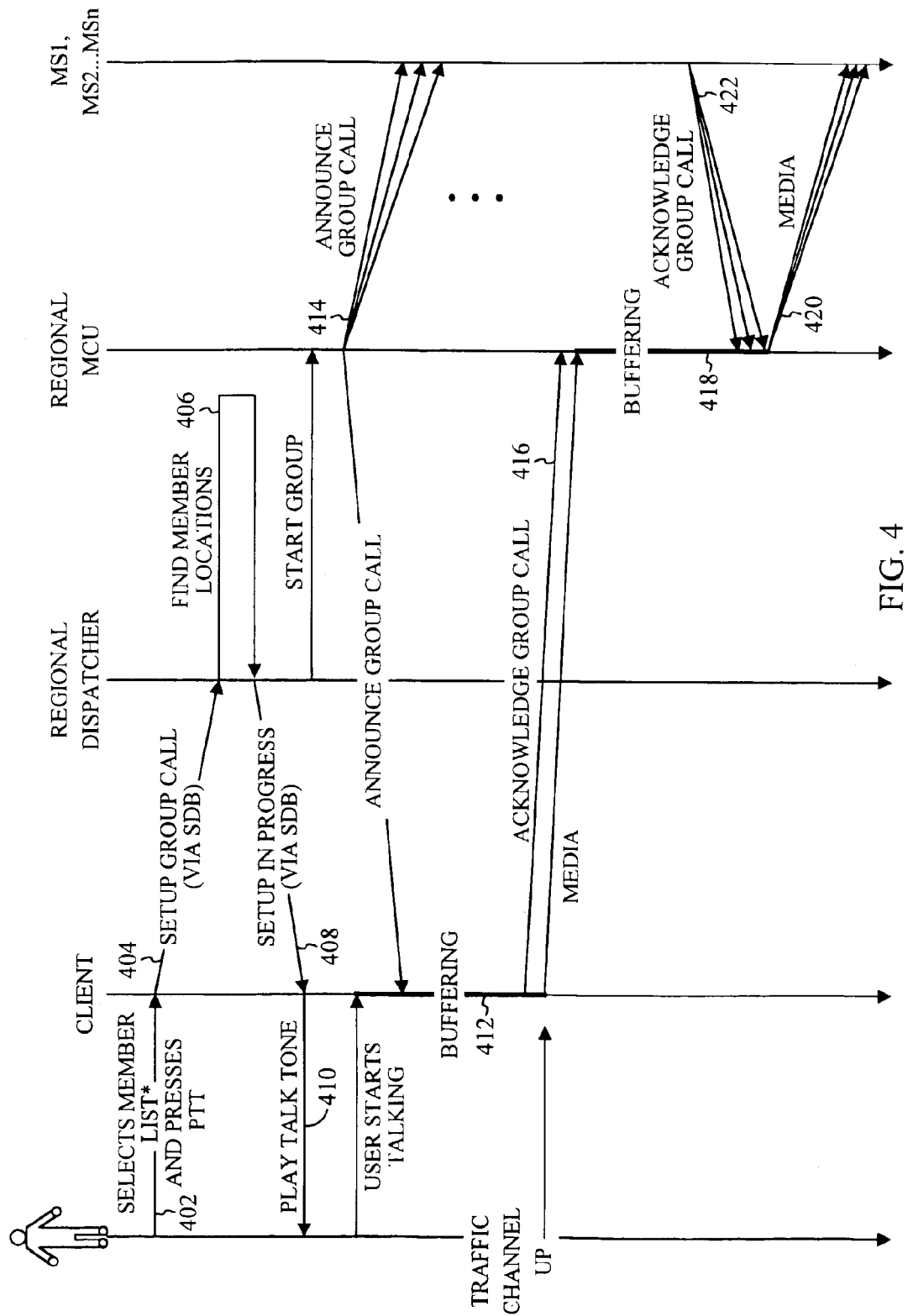
FIG. 4 illustrates an exemplary local, intra-regional call-setup process according to one embodiment.

FIG. 4 illustrates an exemplary message flow for starting a local group call. The user may select 402 one or more target users, one or more pre-defined groups, or a combination of the two and may depress the push-to-talk (PTT) button. The client may send a request 404 to the regional dispatcher to setup the group call, regardless of whether the mobile station has a dedicated traffic channel or not, as will be discussed in more detail later. After the request is sent, if the mobile station's packet data session is dormant, the client may initiate the process of re-establishing dedicated traffic channels and preparing the packet data session for media activity. The client may buffer speech input received from the originator for some period of time.

When the regional dispatcher receives the request, it may expand the pre-defined groups, which may be specified in the request, into target user member lists. Then, the regional dispatcher may retrieve 406 the target users' location information. At this point, the regional dispatcher may also determine if the group is already running in the system. FIG. 4 shows a scenario in which the group is not already running. The late-join call scenario, which is described later herein, illustrates the case in which the group is already running.

After the regional dispatcher locates at least one of the target users, the regional dispatcher may send a response 408 back to the client indicating the group call is being set up.

At this point, the client may optimistically grant 410 the originator's request to talk and start buffering 412 his media.

The regional dispatcher may use the locations of the target users to determine the region in which the call may be assigned. If it is determined that the target users are in the same region as the regional dispatcher, as in FIG. 4, the regional dispatcher may assign the call to a regional MCU. The MCU may send out announcements 414 to the entire group indicating the call is starting. For the target users, the sending of the announcement may trigger their packet data sessions to come out of dormancy and re-establish their traffic channels.

After the client has received the call announcement from the MCU and the mobile station's traffic channel has been re-established, the client may forward 416 the buffered media to the MCU. The MCU may buffer 418 the media received from the originator. In one embodiment, the MCU may buffer the media until the "target response threshold" is met or exceeded. The target response threshold is an indication of the amount of target responses required in order to proceed with the sending of media. The threshold may be a configurable parameter. Once the threshold is met, the MCU replicates and forwards 420 the media to the target users that have responded 422 to the announcement for the call.

Messaging Via Short Data Burst

The "instant response" relates to the response time it takes for the application server to respond to a PTT or call setup request. The goal for responding to any PTT request, including group call setup requests, is to consistently respond to the request in a predetermined time period, e.g., one second or less. In many cases, when a user requests to setup a group call, the user's packet data session is dormant and no dedicated traffic channel exists. Re-establishing dedicated traffic channels may take considerable time. Therefore, communication to the application server may be accomplished through some other means.

To ensure that the group communication system meets the "instant response," small IP datagrams may be sent at any time in either direction, i.e., mobile-originated or mobile-terminated, regardless of the state of the packet data session. In one embodiment, IP datagrams may be sent in short data burst message (SDB) form. In situations when the packet data session is dormant, the SDB message will be sent over the overhead channels. When dedicated traffic channel connectivity is present, the SDB message is sent over the traffic channel.

Referring to FIG. 4, the group call-setup request 404 may be sent via an SDB message. The group call-setup response 408 from the application server may also be sent in an SDB message. The call setup request and response messages sent via SDB messages may enable the group communications system 100 to meet the "instant response" goal.

To complete the process of setting up the group call, the MCU may send out call announcements to the users in the member list, including the originator. These call announcements may be sent via the dedicated traffic channels. In most cases, the group member's packet data sessions are dormant, i.e. no dedicated traffic channels are established. This means the MCU may have to resend the call announcement message on an aggressive reliability schedule until all of the members' traffic channels have been re-established and the members have acknowledged the message or the reliability timer expires. Sending the call announcement aggressively ensures that the media buffers on the client and the MCU are kept at a minimum. The client may send buffered media as soon as it's traffic channel is up and it receives a call announcement containing MCU contact information. The MCU may replicate and forward buffered media as soon as the target response threshold is met or exceeded. This means the quicker the targets receive the call announcement and respond to it, the faster this threshold may be met, then the faster the MCU may stop buffering and start sending media.

The call announcement to the originator may also be sent via SDB. This provides two benefits. First, since the call announcement contains MCU contact information, the group call client may start sending buffered media to the MCU as soon as the mobile station's traffic channel is re-established, which may reduce the RAM requirements on the mobile station for holding the buffered media. Second, if the originator decides to abort the call or release the floor, which may occur prior to the traffic channel being re-established, when the call announcement comes in via SDB, the client may notify the MCU with that information. The impacts of sending the call announcement to the originator via SDB is an increase in the load on the common channels and a requirement for the MCU to give special treatment to the originator's call announcement message.

Initiating a Remote Call

Figure 5:
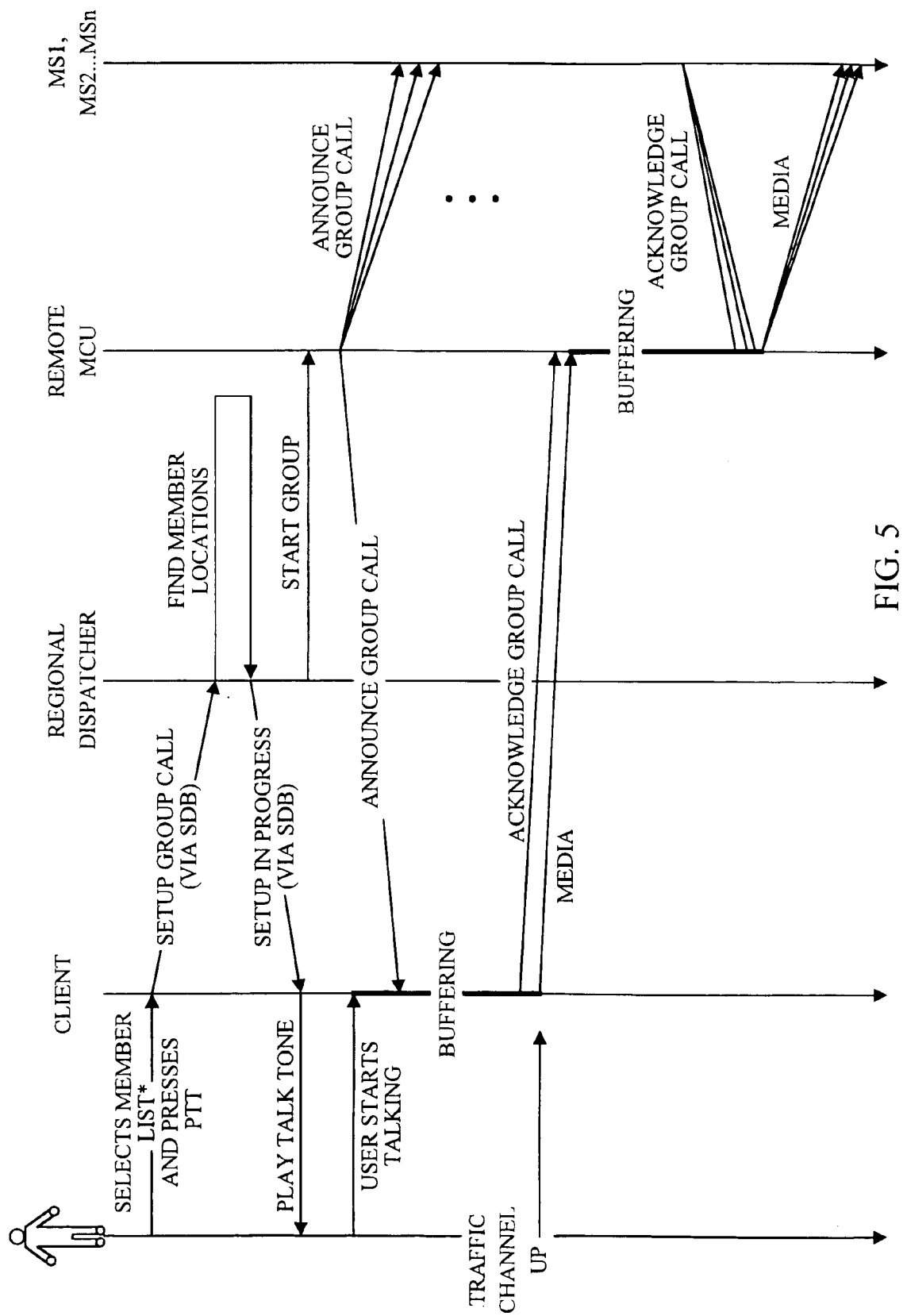
FIG. 5 illustrates an exemplary remote, intra-regional call-setup process according to one embodiment.

Intra-regional calls may be hosted locally if all members are located within the same region. The regional dispatcher may assign an intra-regional call to a remote region due to local resources being overloaded or unavailable. In such cases, the media and signaling may experience additional latency and errors due to extended communication paths between the user's PDSN and the remote MCU. FIG. 5 illustrates an exemplary call setup for a remote, intra-regional call.

Initiating an intra-regional call on a remote host is similar to the call-setup scenario discussed in connection with FIG. 4, with the exception of the regional dispatcher's call assignment to a MCU. After the regional dispatcher has retrieved the location of the group members, it may determine the MCU to which the call may be assigned. The regional dispatcher may make this decision based on the users' location information, loading, and availability of the MCUs. In an intra-regional call the users may be located in the same region, therefore the regional dispatcher may check the loading and availability of the MCU complex in the local region. If the regional dispatcher receives an indication that the local MCU complex is overloaded or temporarily experiencing operational failures, then it may assign the call to a remote MCU. In one embodiment, MCUs may be replications of identical functionality with the exception of the call configuration; therefore, the remote MCU may handle the call similar to the local MCU.

Inter-regional Calls

The group call system 100 may be designed to allow a user to communicate with any other user regardless of their physical location or proximity to the each other. The group communication system 100 may be deployed to limit the number of calls that are inter-regional, because the inter-regional calls require communication between the regional dispatcher and the home dispatcher at call setup time. The call assignment may be to an MCU that is in a remote region from one or more of the call participants. The following sections describe exemplary call flows, timing estimates and messaging schemes for inter-regional calls.

Initiating a Local Call

Figure 6:
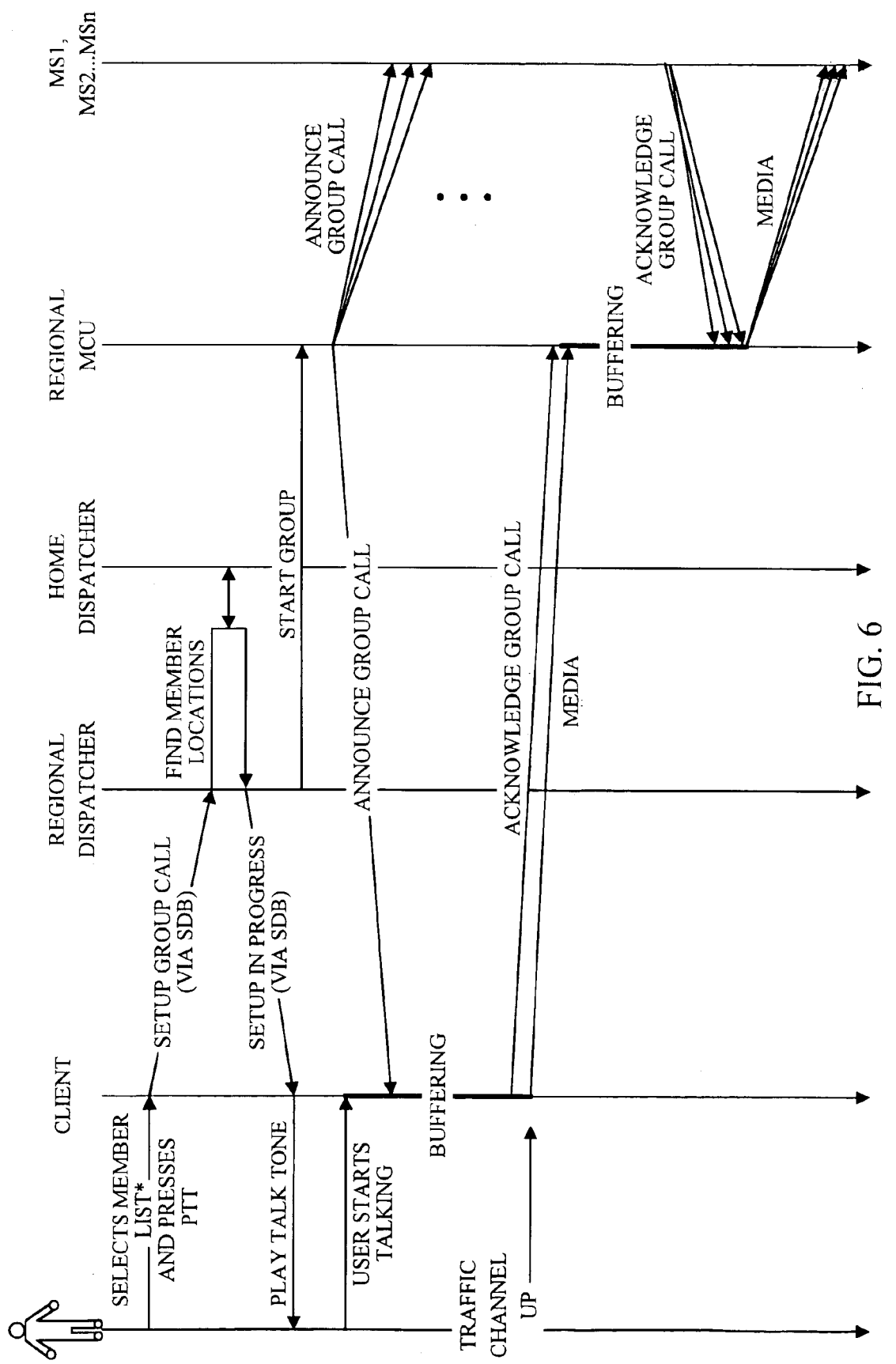
FIG. 6 illustrates an exemplary local, inter-regional call-setup process according to one embodiment.

FIG. 6 illustrates an exemplary message flow for starting a locally-hosted group call. Call setup for a local, inter-regional call is similar to the call setup for a local, intra-regional call, as described in connection with FIG. 4, with the exception of the process in which the regional dispatcher retrieves the location information for the target users. In one embodiment, the regional dispatcher attempts to locate the target users within its cache. If some users are not found in the cache, the regional dispatcher may request assistance from the home dispatcher to locate the users. The home dispatcher may contain user location information for the users that have performed IP registrations using the regional location server. As discussed previously, the regional location server may notify its associated regional dispatcher every time a user registration occurs. Each regional dispatcher may notify the home dispatcher of the user registrations. This allows the home dispatcher to assist the regional dispatchers in finding users that are spread out geographically across different regions.

Initiating a Remote Call

Figure 7:
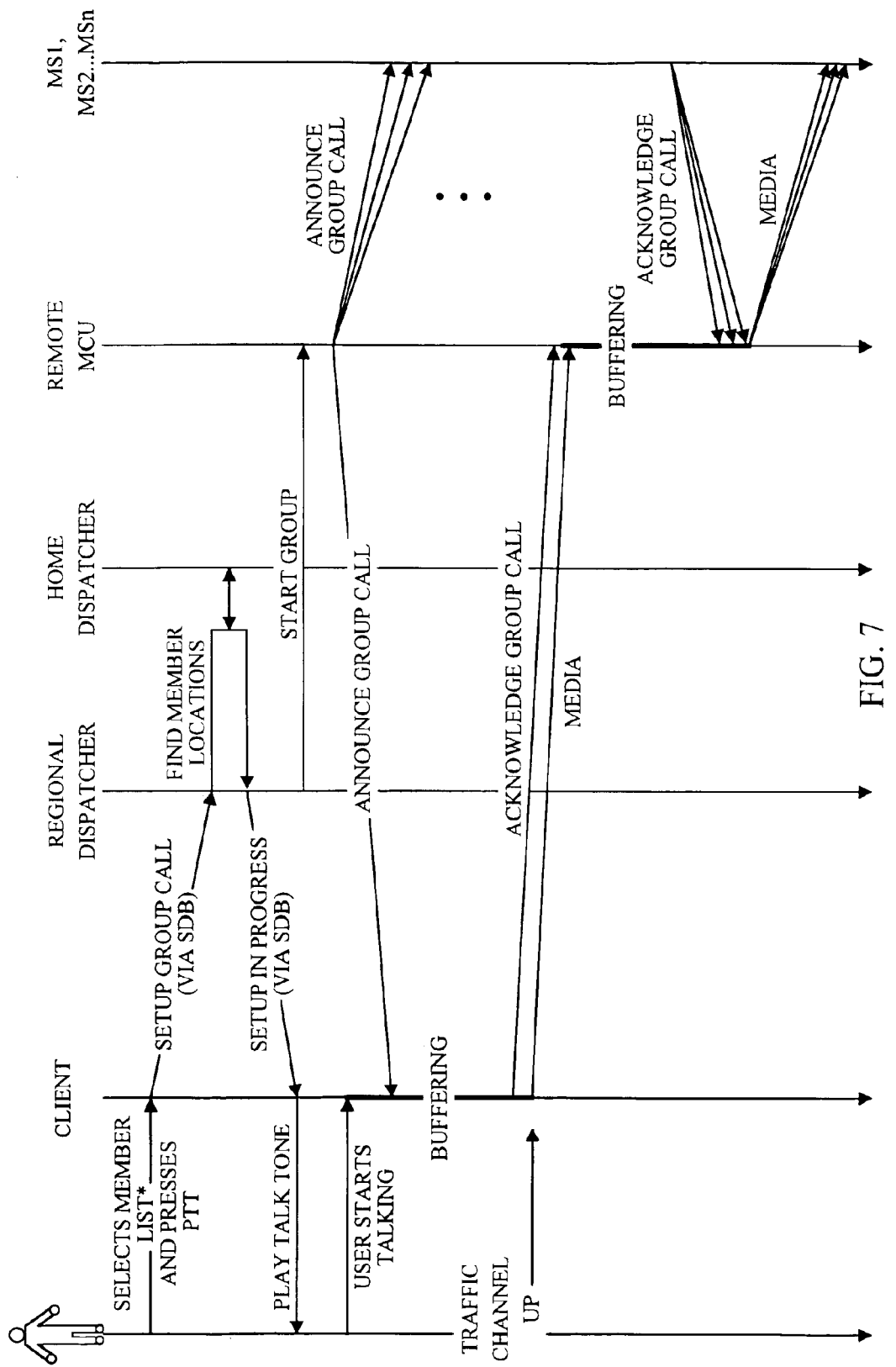
FIG. 7 illustrates an exemplary remote, inter-regional call-setup process according to one embodiment.

FIG. 7 illustrates an exemplary setup for a remote, inter-regional call. Initiating an inter-regional call on a remote host is similar to the call setup scenario, as described in connection with FIG. 4, with the exception of the regional dispatcher's call assignment to a MCU. After regional dispatcher (RD) 114 retrieves the location of the group members, it may determine the MCU to which the call may be assigned. RD 114 may make this decision based on the users' location information, loading, and availability of the MCUs. Using group members' locations, the RD attempts to find the optimal path of travel for the IP packets containing media and signaling, over the service provider's network, for a majority of the members. If a majority of the users are located in a particular region, the call may be assigned to that region. If the users are evenly dispersed across regions, the call may be assigned to one of the regions containing the target users.

Group Call Termination

A group call may end for two reasons: either all participants have requested to leave the call or all participants have stopped talking for a pre-defined period of time, called "hang-time." Each participant may elect to end participation in the call prior to the planned end of the call. If all participants leave the call, the MCU may terminate the call and release all resources assigned to it. If all but one participant leaves the call, the MCU may notify the participant, referred to as the "lonely user." The lonely user has the option of leaving the call immediately or waiting for the hang-time timer to expire, which may trigger the MCU to disband the call.

The MCU may terminate the call upon the expiration of the hang-time timer. The MCU may track each talk spurt and set a timer after the completion of a talk spurt. This timer is referred to as the hang-time timer and may track the duration of silence, i.e., no talking or media flow activity, in the call. If the call remains silent for duration of the hang-time, which may be configured by the service provider, the MCU may assume the participants are no longer interested in the call, and therefore, terminates the call.

User Initiated Call Termination

Figure 8:
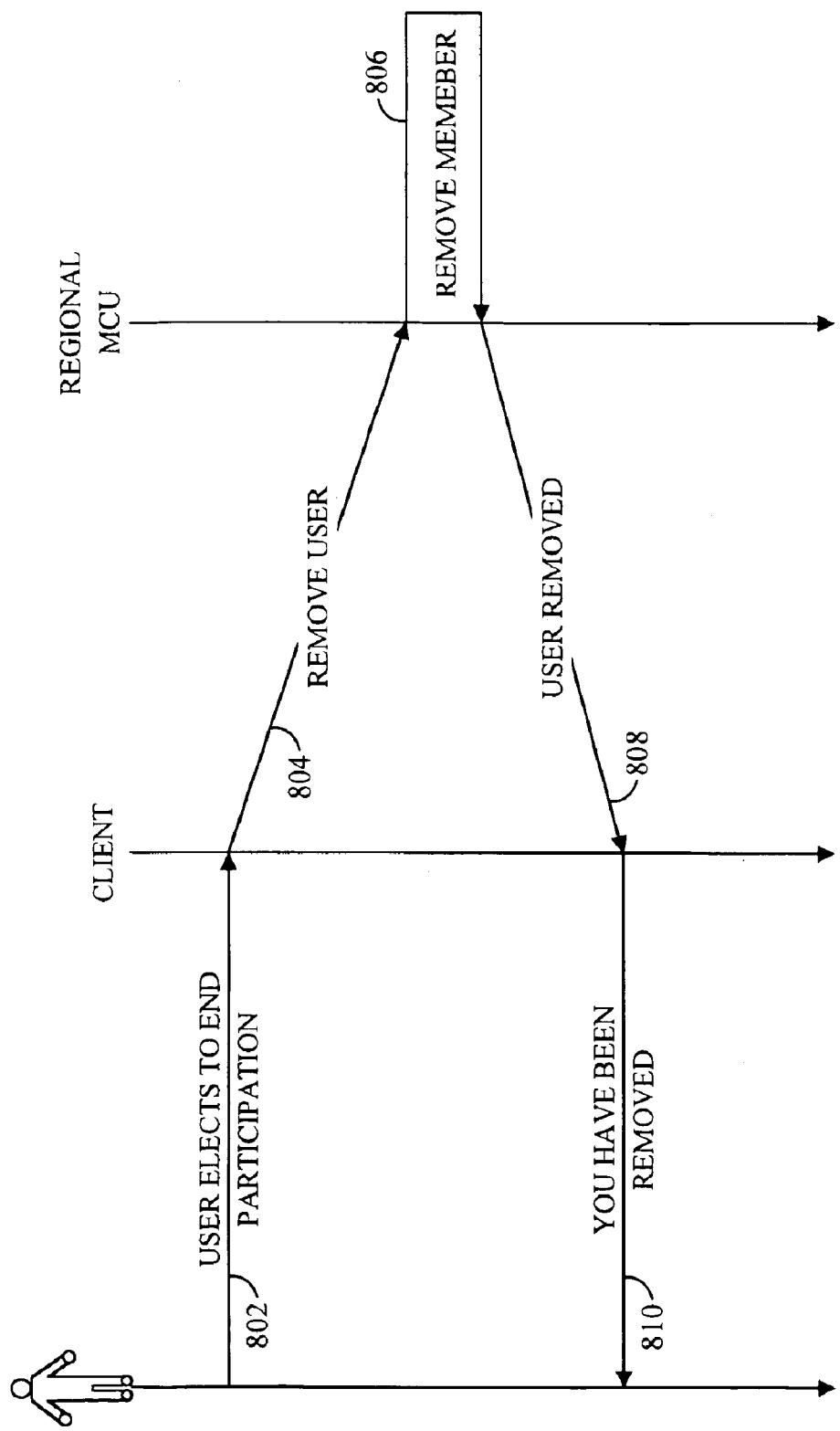
FIG. 8 illustrates an exemplary process for leaving a group call according to one embodiment.

FIG. 8 illustrates an exemplary scenario in which a user has elected to end participation in a group call. The scenario depicts the message flow to terminate the user's participation. When the user elects 802 to end participation in the group call, the client may send 804 a request to the MCU to remove the user from the call. The MCU may remove 806 the user from the call and notify 808 the client that the user has been removed 810.

Server Initiated Call Termination

Figure 9:
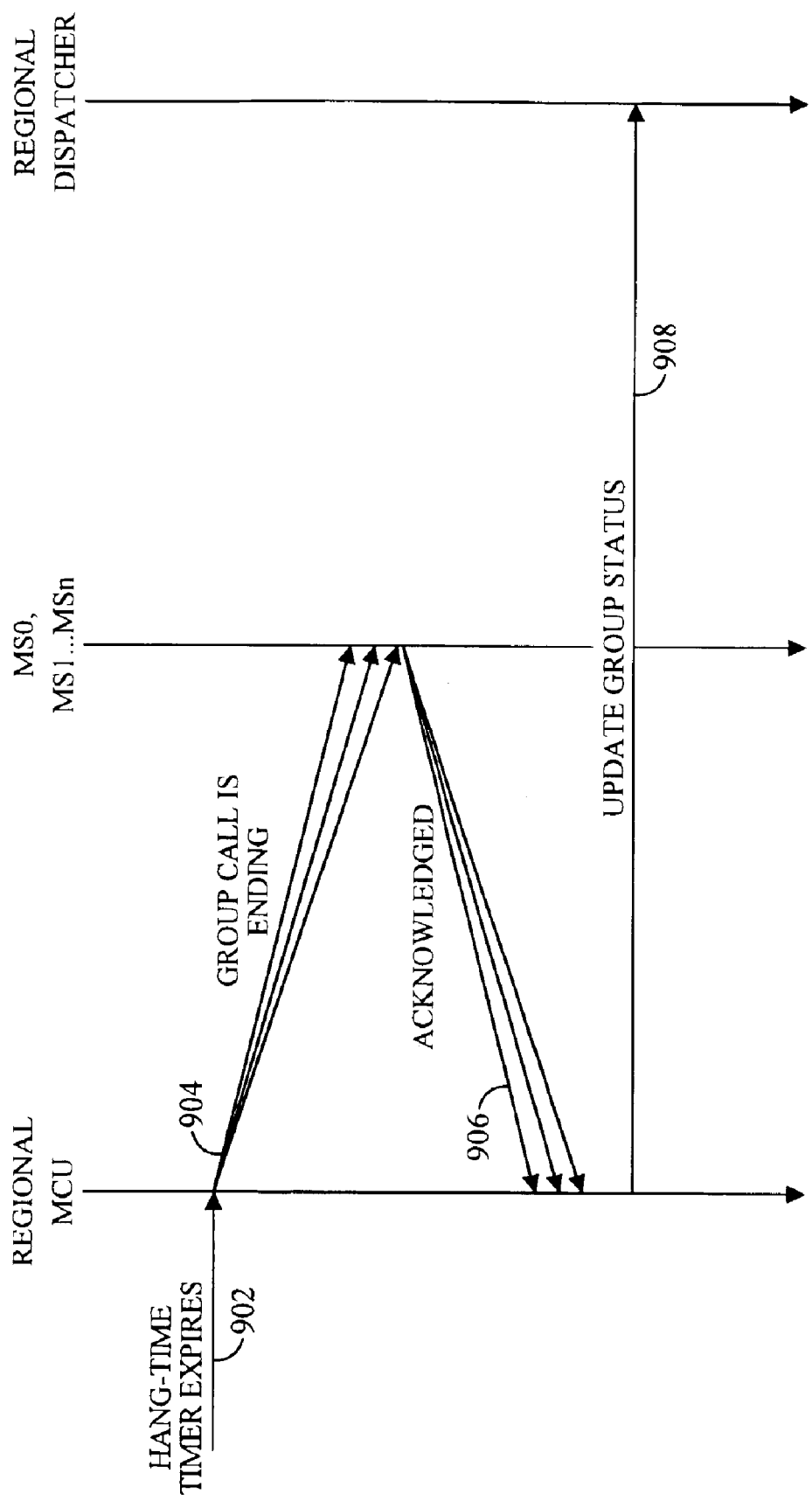
FIG. 9 illustrates an exemplary process for terminating a group call according to one embodiment.

FIG. 9 illustrates an exemplary message flow that occurs when the hang-time timer expires and the MCU terminates the group call. Upon the expiration of the hang-time timer 902, the MCU may send 904 the participants a notification that the call is ending. Each client that receives a call end notification may reply 906 with an acknowledgement. Upon receipt of the acknowledgements, the MCU may notify 908 the RD that the call has ended and may release the resources that were assigned to the call.

Sending an Alert

Figure 10:
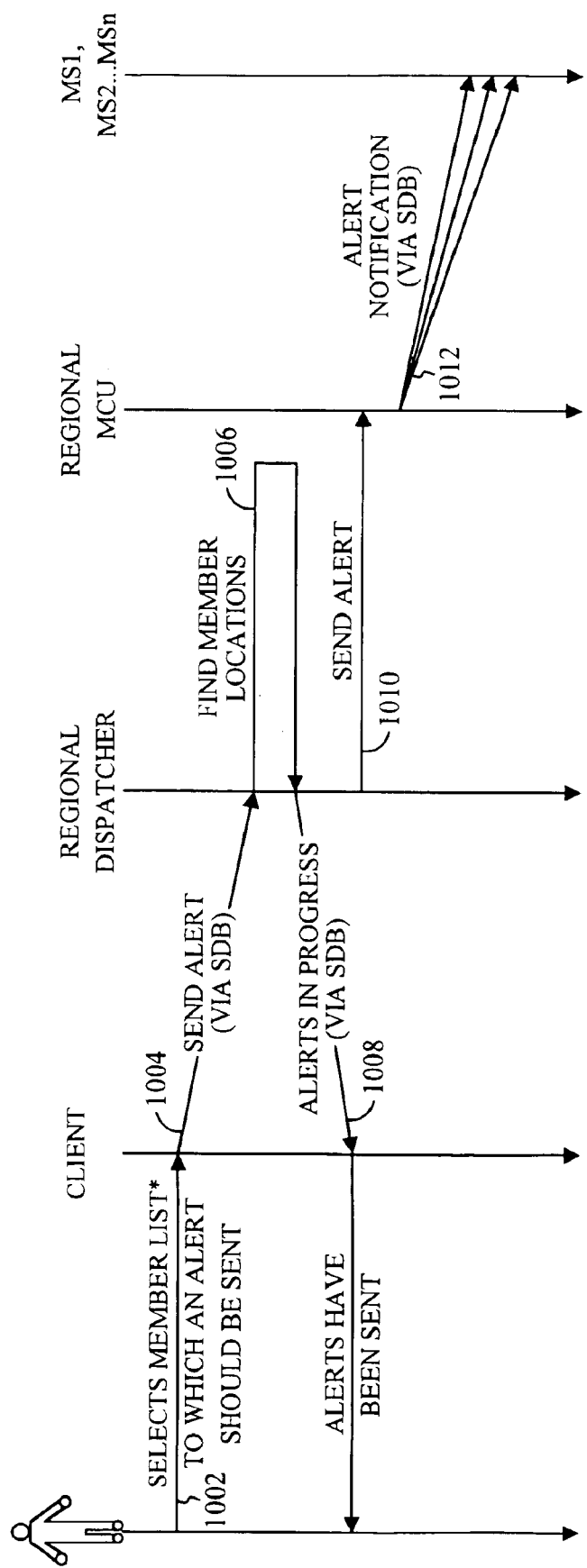
FIG. 10 illustrates an exemplary process for sending an alert for a group call according to one embodiment.

The alert mechanism may be used to notify target users that another user, the alert originator, has expressed a desire to have them participate in a group call. The alert mechanism may contain a text message that allows the originator to specify the subject of the call, the desired time of the call, or any other user customizable text messages. FIG. 10 illustrates an exemplary message flow that occurs when a user sends an alert.

The originator may select 1002 one or more target users, one or more pre-defined groups, or a combination of the two, and may indicate an alert may be sent. The client may send 1004 a request to the RD to send out alerts to the target users specified in the request. When the RD receives 1006 the request, it may expand the pre-defined groups specified in the request into target user member lists, and the RD may retrieve the target users' location information. After the RD has located at least one of the target users, the RD may send a response 1008 back to the client. The RD may assign 1010 the alert request to a MCU to broadcast alert messages 1012 to the target users.

As noted on FIG. 10, the alerts request may be sent via short data burst (SDB). Sending alerts via SDB messages allows the involved parties' packet data sessions to remain dormant. Alert notification contains the necessary information to allow the target users to setup group calls with the originator and the rest of the target users, e.g., by selecting the alert notification and pressing PTT. When this occurs, the group call setup proceeds similar to the call set-up scenario discussed in connection with FIG. 4.

Late Join

10A group call setup request is considered a late join, if it is determined that the member list, which may be specified in the call setup request, is identical to one which is associated with a call already in progress in the system. This situation may occur in one of two ways. First, the user may create a member list identical to one that already has a call associated with it, e.g., by selecting the exact same user(s) and/or group(s) and depressing the PTT button. Second, the user may select a call, which is still running in the system, from the call history list and depress PTT. In either case, the RD may detect that the call the user has requested to start is already in progress, and treat the user as a late join.

Figure 11:
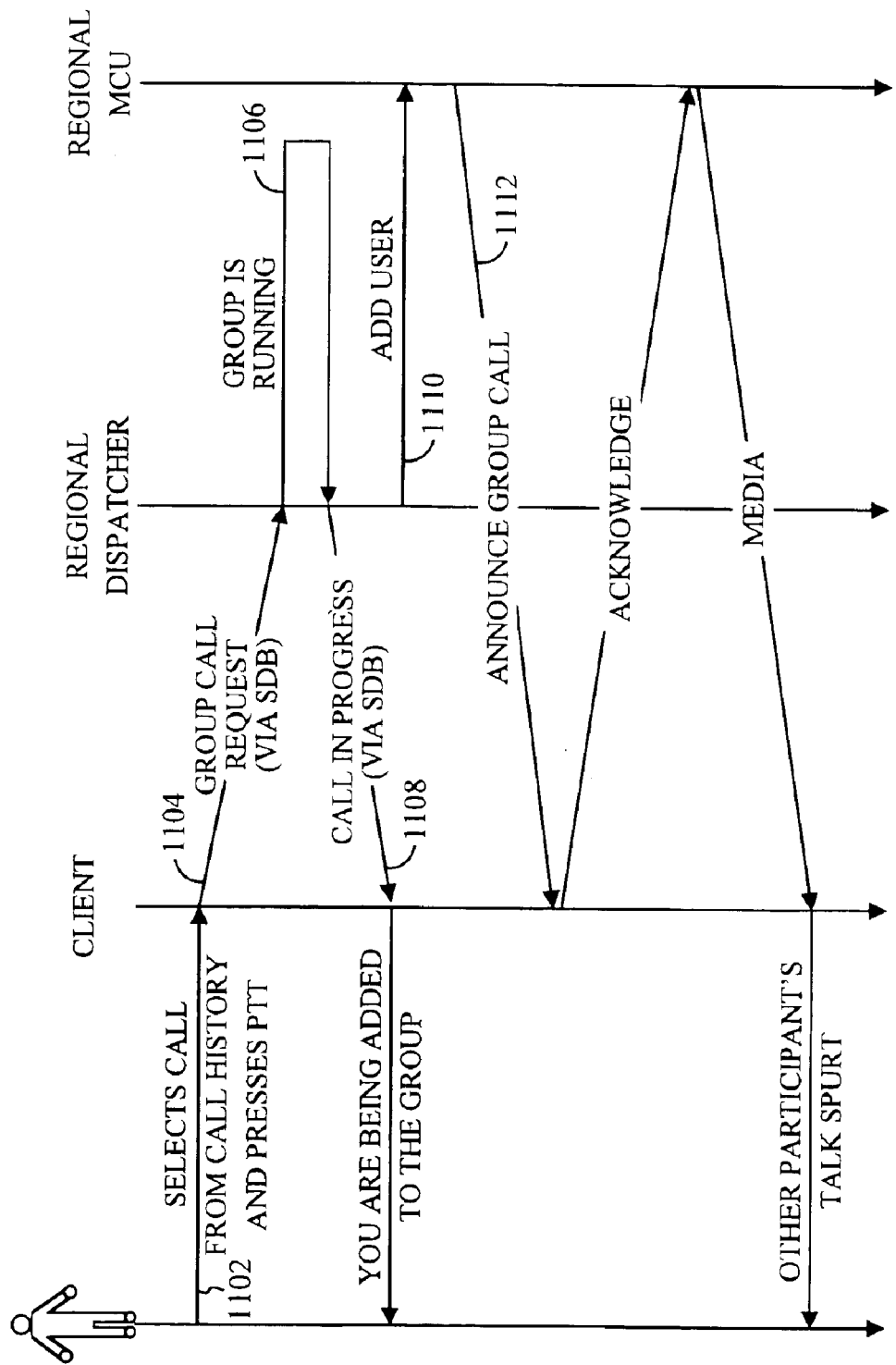
FIG. 11 illustrates an exemplary process for late-joining a group call according to one embodiment.

FIG. 11 illustrates an exemplary late-join case in which a user may select a call from the call history list. The user may select 1102 a call from the call history list and press the PTT button. The client may send 1104 a request to the RD to start the group call. The RD may determine the call is already running 1106 and send a response 1108 to the client that the user is being added to a call in progress. If the call is already running, the floor may not be granted to the user because a current call participant may already be holding floor by the time the late join user is prepared to receive media, i.e., packet data session is brought out of dormancy. The RD may request 1110 the MCU that is hosting the call to add the late-join user to the group. The MCU adds the user and sends 1112 an announcement to the user containing the MCU's contact information. After the late join user's traffic channel is re-established, media flow within the call may be transmitted to the user. At this time, the late join user may attempt to request the privilege to talk.

The late join scenario is similar to the scenario for initiating a new group call as discussed in connection with FIG. 4. The differentiating factor is the late join user is denied the floor in response to the initial group call setup request.

Talker Arbitration

In one embodiment, each group call user is assigned a talker pre-emption rank, which determines what level of rights the user has when requesting privileges to seize the "floor" and begin talking. After the group call is setup, the MCU may be responsible for floor control and determining if a participant requesting the floor may be allowed to speak. The MCU may perform talker arbitration when two or more call participants are competing for control of the floor for a particular group.

Figure 12:
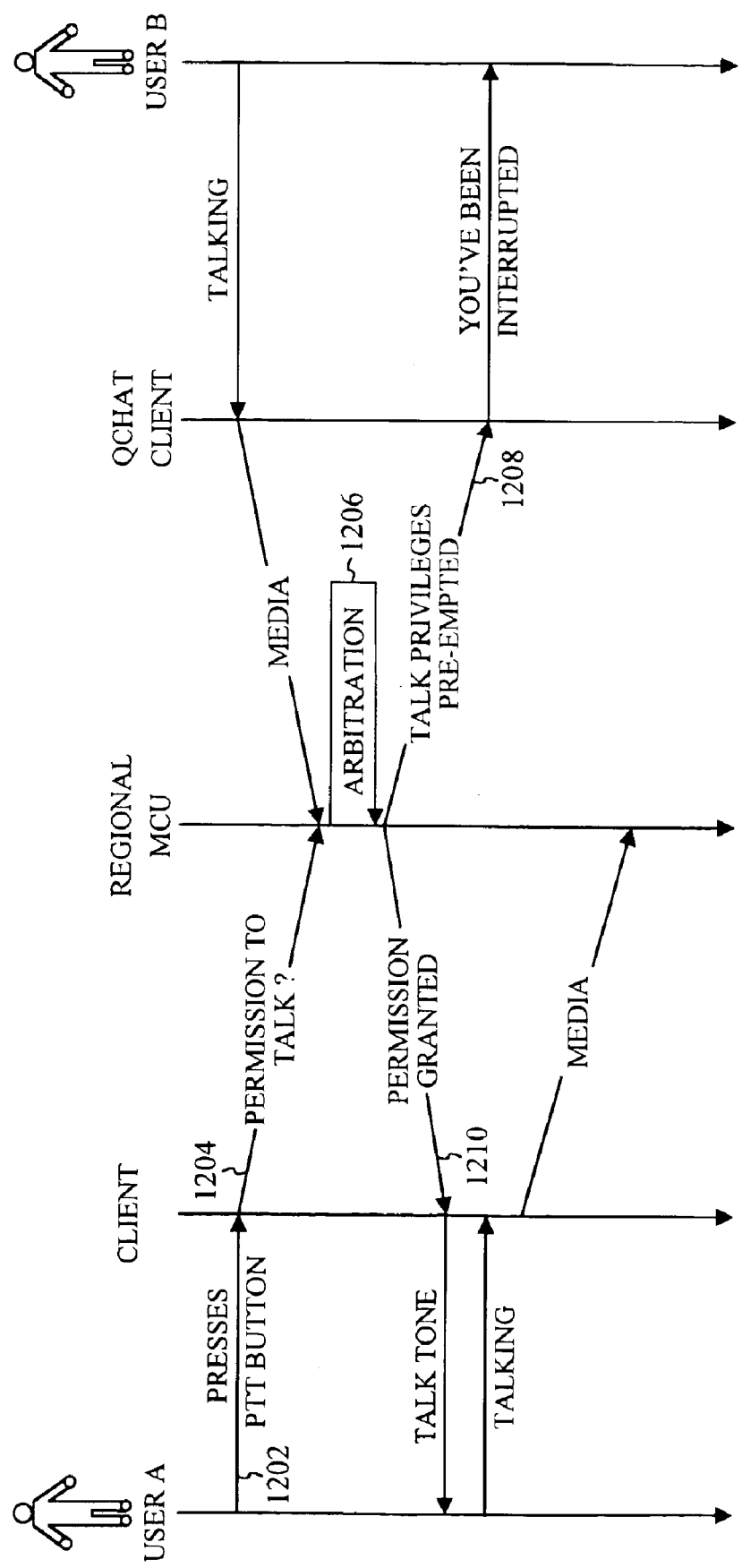
FIG. 12 illustrates an exemplary process for pre-empting a talker according to one embodiment.

FIG. 12 illustrates the exemplary events that may occur during an arbitration process. The arbitration scheme used in this scenario allows the pre-emption of user B when user A requests the floor. User B has control of the floor, i.e. user B is speaking, when user A requests permission to talk by pressing 1202 the PTT button. The client may send 1204 a message to the MCU requesting permission to talk. The MCU may perform talker arbitration 1206 and determine that user B may be pre-empted and user A granted the floor. In order to ensure a break in media flow, i.e. user B may stop talking before user A's media is transmitted, the MCU first sends 1208 a message to the client for user B, indicating the floor has been preempted by another user, and then send 1210 a response granting the floor to user A.

Adding Users to an Active group Call

Figure 13:
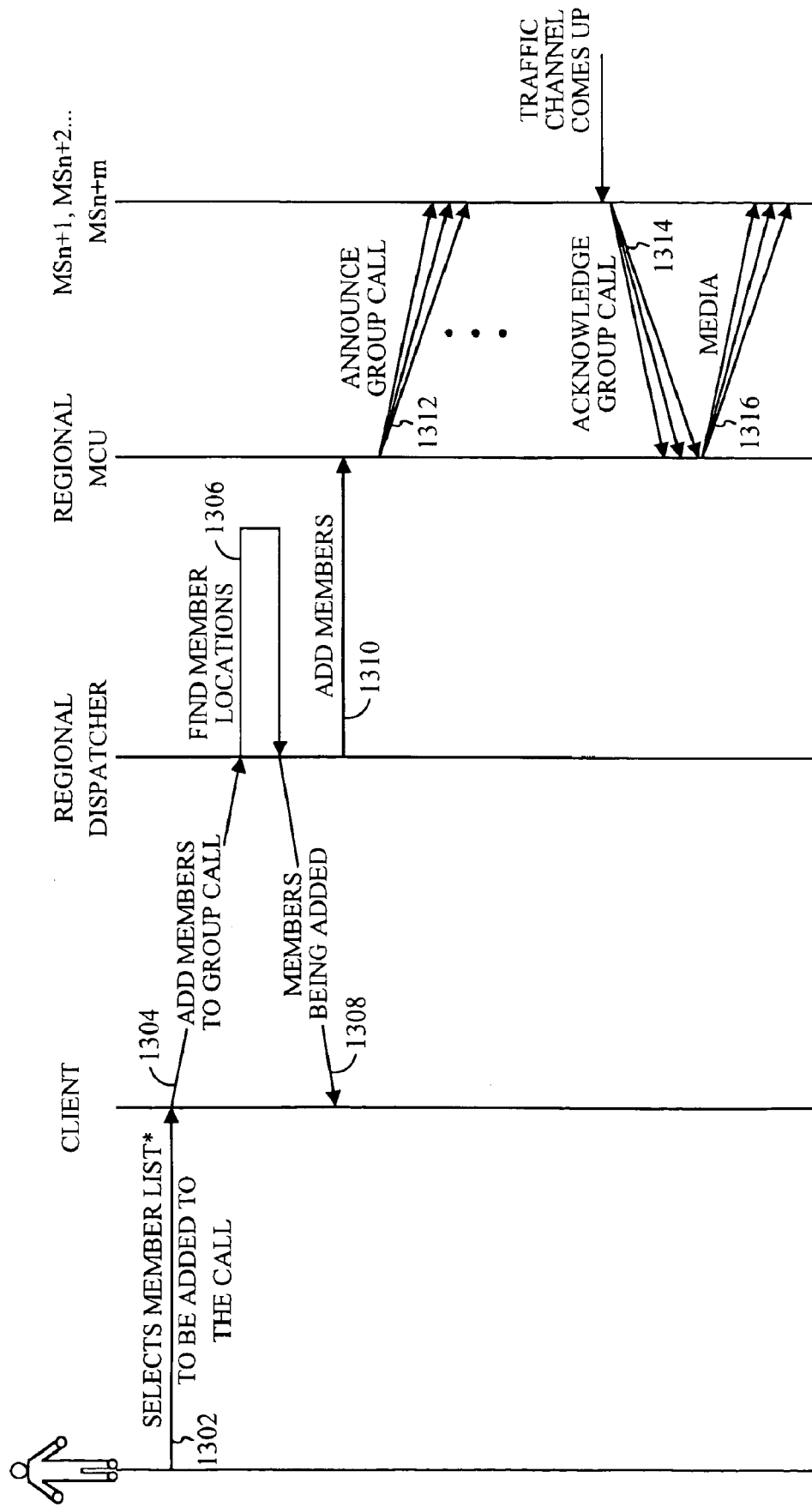
FIG. 13 illustrates an exemplary process for adding new members to an active group call according to one embodiment.

The group communications system 100 allows a group-call participant to add new users to a group call in progress. This is accomplished by the call participant selecting one or more target users, one or more pre-defined groups, or a combination of the two, and indicating that the participant would like the targets to be added to the group call the participant is currently in. FIG. 13 illustrates the events that occur when new targets are added to a group call that is in progress. The call participant may select13O2 one or more target users, one or more groups, or a combination of the two that should be added to the call. The client may send 1304 a message to the RD requesting that the specified target users be added to the group call in progress, which may be specified in the request. When the RD receives the request, it may expand the predefined groups, specified in the request, into target user member lists. Then, the RD may retrieve 1306 the target users' location information. After the RD has located at least one of the target users, the RD may send 1308 a response back to the client indicating that the targets are being added to the call. The RD may send 1310 a request to the MCU to add the specified users to the call. The MCU may send 1312 call announcements out to the new targets, which may start the process of bringing their packet data sessions out of dormancy. The announcements may be sent on a reliability schedule to ensure the targets receive the message. After the targets' traffic channels are re-established, the targets may send 1314 acknowledgements to the MCU. The additional targets may be included 1316 in the media and signaling communication that is occurring in the call.

Removing Members from an Active group Call

Figure 14:
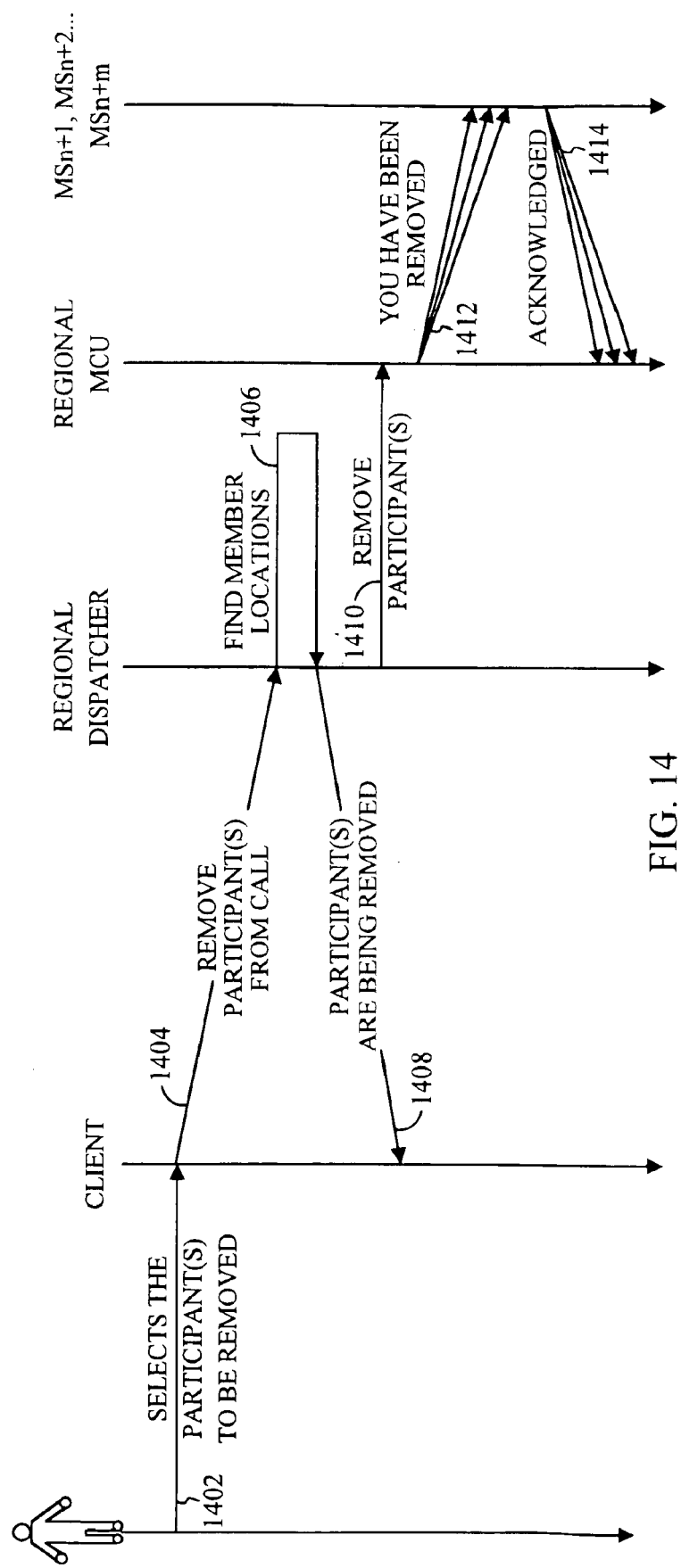
FIG. 14 illustrates an exemplary process for removing participants from a group call according to one embodiment.

The group communications system 100 allows a group-call participant to remove members from an active group. In one embodiment, this may be accomplished by a call participant selecting one or more target participants and indicating that they should be removed from the group call. FIG. 14 illustrates the exemplary events that may occur when participants are removed from a group call in progress. The group-call participant may select 1402 one or more target participants that are to be removed from the call. The client may send 1404 a message to the RD, requesting that the targets, which may be specified in the message, be removed from the group call. When the RD receives the request, it may retrieve 1406 the target's location information and may send 1408 a response back to the client indicating the targets are being removed. The RD may send 1410 a request to the MCU to remove the targets from the call. The MCU may send 1412 messages to the targets, which may be specified in the remove request, indicating that they are being removed from the call. The targets may send 1414 acknowledgments to the MCU.

Un-registering

Figure 15:
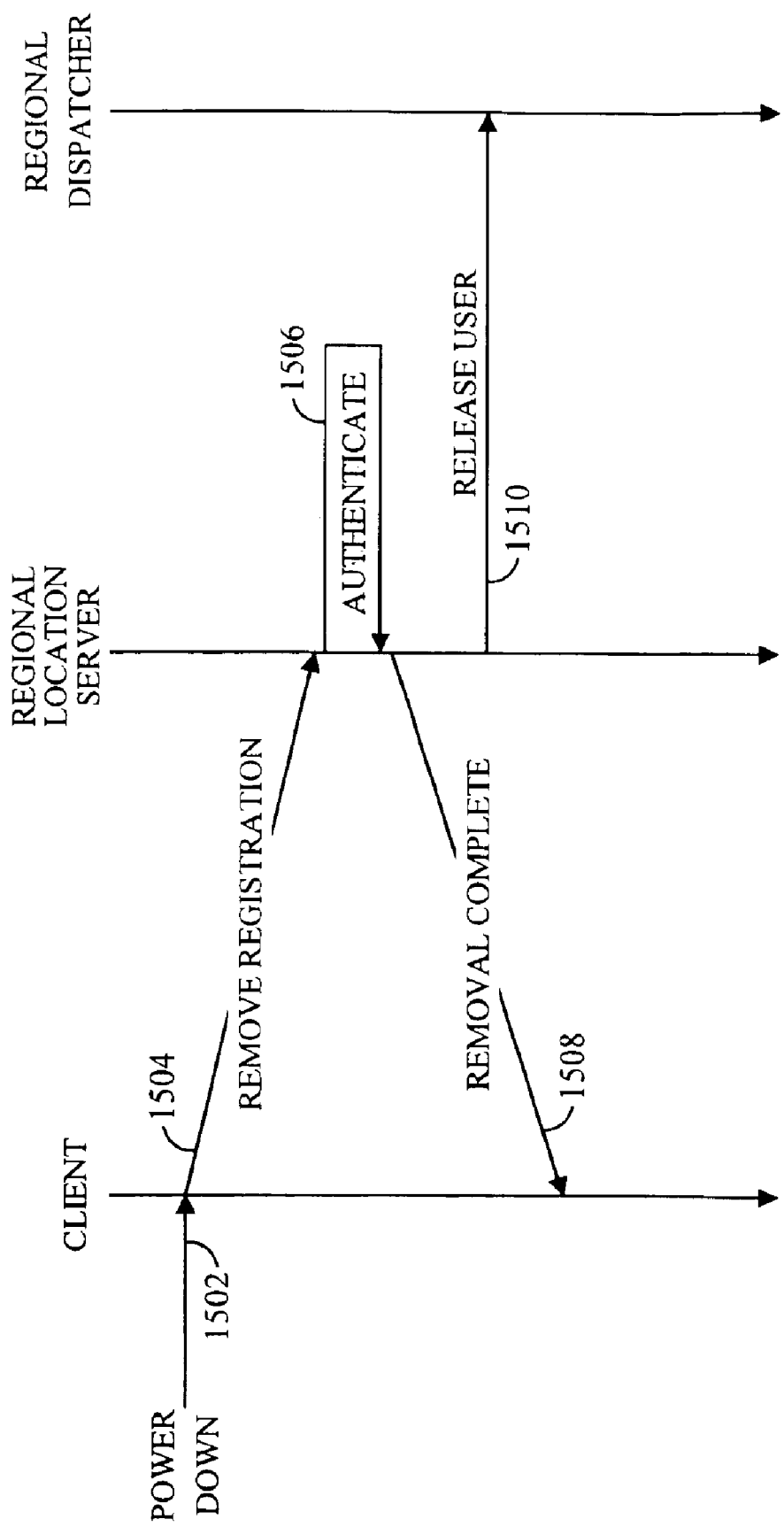
FIG. 15 illustrates an exemplary process for removing a user's registration according to one embodiment.

When a user no longer wishes to be contacted by the application server or any other IP application that uses the user's IP address to contact the user, the un-register function may be performed. The un-register function removes the user's IP address and other contact information from the RLS and frees any resources allocated on behalf of the user. FIG. 15 illustrates how the user's registration is removed from the RLS as a result of the mobile station being powered down, according to one embodiment. The client may receive 1502 an indication that the mobile station, which the client resides on, is being powered down. As a part of the shut down process, the client may send 1504 a message to the RLS, indicating the user's location information should be removed. The RLS may authenticate 1506 the request to ensure it is from a valid source. Upon successful authentication, the RLS may notify 1508 to the client with a success indication, and may notify 1510 the RD about the removal of the user. The RD may remove the user's data records from its cache and may free the resources that may have been allocated to the user. In the event of a failure to un-register, the user's location information may eventually be removed from the RLS when the time associated with the expiry field has elapsed.

In one embodiment, the group communication system 100 supports both the chat-room model and the ad-hoc model. In the chat-room model, the groups are pre-defined, which may be stored on the dispatch server. The pre-defined groups may be public, implying that the group has an open member list, i.e. any dispatch user is a potential participant. In the chat-room model, the call is started when the first person opts to join the chat-room, and the call remains running, with server resources assigned to the call, regardless of talk activity, for a pre-determined amount of time, which may be configured by the service provider. Users specifically request to join and leave these types of calls. During periods of talk inactivity, each call is brought into a group dormant state, as will be discussed later, until a user requests permission to talk.

In the ad-hoc model, groups may be defined in real-time and have a closed member list associated with them. A closed member list may specify which users are allowed to participate in the group, may not be available to users outside of the closed member list, and may only exist for the life of the call. Ad-hoc group definitions may not be stored anywhere; they may be used to establish the call and released after the call has ended.

An ad-hoc group may be formed when an originating user selects one or more target users and generates a request, which is sent to a server to start the call. The target users may be sent a notification that they have been included in a group and may automatically be joined into the associated call, i.e., no user action may be required. When an ad-hoc call becomes inactive, the application servers may "tear down" the call and free the resources assigned to it, including the group definition used to start the call.

When operating in the chat-room model, in the group communications system 100, a group of communication device users, individually known as net members, communicate with one another using a communication device assigned to each net member. The term "net" denotes a group of communication device users authorized to communicate with each other.

In one embodiment, a central database may contain information identifying the members of each particular net. More than one net may operate in the same communication system. For instance, a first net may be defined having ten members and a second net may be defined, having twenty members. The ten members of the first net may communicate with each other, but may not communicate with members of the second net. In another embodiment, members of different nets are able to monitor communications between members of more than one net, but may be only able to transmit information to members within their own net.

A net may operate over an existing communications system, without requiring substantial changes to the existing infrastructure. Thus, a controller and users on a net may operate in any system capable of transmitting and receiving packet information using Internet protocol (IP), such as a Code Division Multiple Access (CDMA) system, a Time Division Multiple Access (TDMA) system, a Global System for Mobile Communications (GSM) system, satellite communication systems such as Globalstar™ or Iridium™, or a variety of other systems.

Net members may communicate with each other using an assigned communication device, shown as communication devices (CDs) 120 and 122. CDs 120 and 122 may be wireline or wireless communication devices such as terrestrial wireless telephones, wireline telephones having with push-to-talk capability, satellite telephones equipped with push-to-talk functionality, wireless video cameras, still cameras, audio devices such as music recorders or players, laptop or desktop computers, paging devices, or any combination thereof. For example, the CD 120 may comprise a wireless terrestrial telephone having a video camera and display. Furthermore, each CD may be able to send and receive information in either a secure mode, or a non-secure (clear) mode. Throughout the following discussion, reference to an individual CD infers a wireless push-to-talk phone. However, it should be understood that reference to a CD is not intended to be limited as such, and may encompass other communication devices that have the capability to transmit and receive packet information in accordance with the Internet Protocol (IP).

In the group communications system 100, a transmission privilege generally allows a single user to transmit information to other net members at a given time. The transmission privilege is granted or denied to a requesting net member, depending on whether or not the transmission privilege is currently assigned to another net member when the request is received. The process of granting and denying transmission requests is known as arbitration. Arbitration schemes may evaluate factors such as priority levels assigned to each CD, the number of unsuccessful attempts to gain transmission privilege, the length of time a net member has held transmission privilege, or other factors, in determining whether a requesting net member is granted the transmission privilege.

In order to participate in the system 100, CDs 120 and 122 each may have the ability to request transmission privilege from a controller or MCU 116. MCU 116 may manage the real-time and administrative operation of the groups. The MCU is any type of computer type device having at least one processor and memory. MCU 116 may operate remotely through either a communication system service provider, members, or both, assuming that authorization is provided by the service provider. MCU 116 may receive group definitions through an external administration interface. Group members may request administrative actions through their service provider or administrate net functions through defined systems, such as a member operated security manager (SM) that conforms to a MCU administration interface. MCU 116 may authenticate the party who attempts to establish or modify a net.

The SM may perform key management, user authentication, and related tasks to support secure nets. A single group communication system may interact with one or more SMs. The SM may not be involved in the real-time control of a net, including net activation or PTT arbitration. The SM may have administration capabilities compatible with MCU interface to automate administration functions. The SM may also be capable of acting as a data endpoint for the purpose of participating in a net, broadcast net keys, or simply monitor net traffic.

In one embodiment, the means for requesting the transmission privilege from a MCU comprises a push-to-talk (PTT) key or switch. When a user in the system 100 desires to transmit information to other members, the user may depress the push-to-talk switch located on his or her CD, sending a floor-control request to obtain the transmission privilege from MCU 116. If no other net member is currently assigned the transmission privilege, the requesting user may be granted the transmission privilege and the user may be notified by an audible, visual, or tactile alert through the CD. After the requesting user has been granted the transmission privilege, information may then be transmitted from that user to the other member.

In one embodiment of the present invention, each wireless net member establishes a forward link and a reverse link with one or more base stations 126, or alternatively with a satellite gateway, as the case may be. Voice and/or data may be converted into data packets, using a CD, for example, which are suitable for a particular distributed network 128 through which communications to other users may take place. In one embodiment, distributed network 128 is the Internet.

In one embodiment, a dedicated forward channel is established in each communication system, i.e., a terrestrial communication system and a satellite communication system, for broadcasting information from each net member to the other net members. Each net member may receive communications from other net members over the dedicated channel. In another embodiment, a dedicated reverse link is established in each communication system for transmitting information to MCU 116. In one embodiment, a combination of the above schemes may be used. For example, a scheme may involve establishing a dedicated forward broadcast channel but requiring wireless CDs to transmit information to MCU 116 over a dedicated reverse link assigned to each CD.

When a first net member wishes to transmit information to other members of the net, the first net member may request the transmission privilege by pressing a push-to-talk key on his or her CD, which generates a request formatted for transmission over the distributed network 128. In the case of CDs 120 and 122, the request may be transmitted over the air to one or more base stations 126. A mobile switching center (MSC) 130, which may include a well-known inter-working function (IWF), packet data serving node (PDSN), or packet control function (PCF), for processing data packets may exist between BS 126 and the distributed network 128. The request may be transmitted through the public switched telephone network (PSTN) to a modem bank, which may receive the request and provide it to distributed network 128. A terminal may monitor traffic of the system 100 through its connection to distributed network 128.

If no other member currently holds the transmission privilege, when the MCU 116 receives a transmission privilege request, MCU 116 may transmit a message to the requesting net member, notifying it that the transmission privilege has been granted. Audio, visual, or other information from the first net member may then be transmitted to the other net members by sending the information to MCU 116, using one of the just-described transmission paths. In one embodiment, MCU 116 then provides the information to the other net members by duplicating the information and sending each duplicate to the other net members. If a single broadcast channel is used, the information need only be duplicated once for each broadcast channel in use.

In an alternative embodiment, MCU 116 is incorporated into MSC 130 so that data packets from supporting base stations are routed directly to MCU 116 without being routed onto distributed network 128. In this embodiment, MCU 116 is still connected to distributed network 128 so that other communication systems and devices may participate in a group communication. In yet another embodiment, the MCU 116 may be incorporated into the PDSN or the PCF modules of the MSC 130.

In one embodiment, MCU 116 maintains one or more databases for managing information pertaining to individual net members as well as to each defined net. For example, for each net member, a database may comprise information such as the user name, account number, a telephone number, or dial number, associated with the member's CD, a mobile identification number assigned to the CD, the current member's status in the net, such as whether the member is actively participating in the net, a priority code for determining how the transmission privilege is assigned, a data telephone number associated with the CD, an IP address associated with the CD, and an indication of which nets the member is authorized to communicate with. Other related types of information may also be stored by the database with respect to each net member.

In one embodiment, the CD may form connections with individual communication terminals to form one talk group, or net. The MCU may comprise a variety of functional capabilities in hardware and software that are configurable in different ways to accommodate different applications. The MCU may provide capability to manage real-time, administrative, and authenticity operations of the nets, push-to-talk (PTT) request arbitration, maintenance and distribution of net membership and registration lists, call set-up and tear-down of necessary communication, e.g., CDMA, systems and network resources, as well as overall control of net status.

The nets may be within a stand-alone deployable cellular system, or a large multiple site configuration. In the case of a large configuration, multiple MCUs may be deployed geographically to form a single, integrated system, each operating as a plug-in module into existing cellular infrastructure. As such, new features introduced by the nets are available to cellular users without requiring modification to existing cellular infrastructure.

The MCU may maintain a list of defined nets. In one embodiment, each net definition includes a net identifier, a list of members, including phone numbers or other identifying information, user priority information, and other generic administration information. Nets may be statically defined as either clear or secure, and transitions between clear and secure may not be permitted. A secure net typically uses media encryption to provide authentication and guard against eavesdropping. Media encryption for secure nets is implemented on an end-to-end basis, meaning encryption and decryption may take place within the communication device. The MCU may operate without knowledge of security algorithms, keys, or policies.

Figure 16:
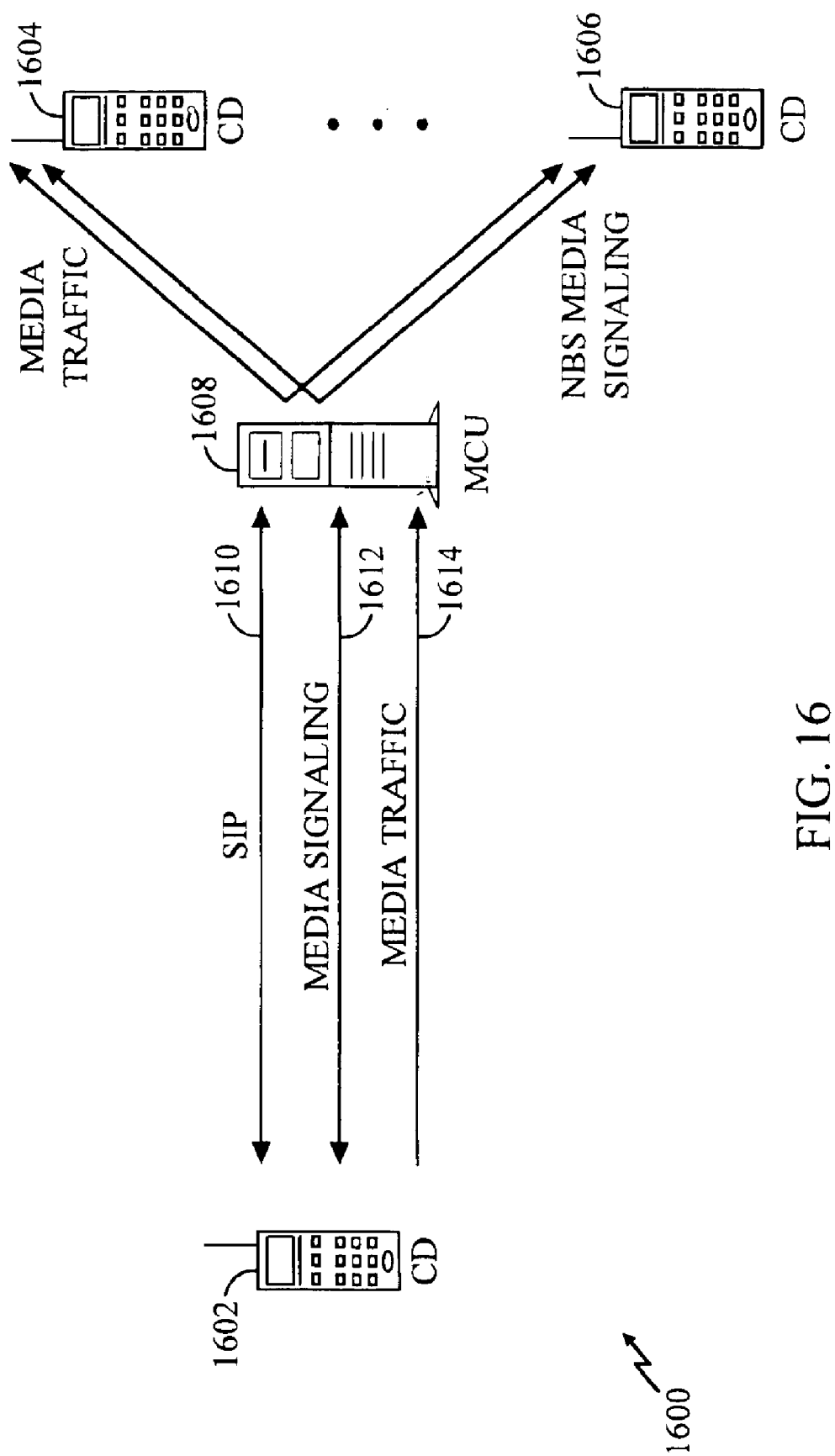
FIG. 16 illustrates how several communication devices interact with a communications manager according to one embodiment.

FIG. 16 illustrates an exemplary group 1600 for showing how communication devices 1602, 1604, and 1606 interact with a MCU 1608. Multiple MCUs may be deployed as desired for large-scale groups. In FIG. 16, CD 1602 has permission to transmit media to other members of the group. In this case, CD 1602 is known as the talker and transmits media over a channel. When CD 1602 is designated as the talker, the remaining participants, CD 1604 and CD 1606, may not have permission to transmit media to the group. Accordingly, CD 1604 and CD 1606 are designated as listeners.

As described above, CDs 1602, 1604, and 1606 are connected to MCU 1608, using at least one channel. In one embodiment, the channel is divided into separate channels comprising a session initiation protocol (SIP) channel 1610, a media signaling channel 1612, and a media traffic channel 1614. SIP channel 1610 and media signaling channel 1612 may be used at any time as bandwidth allows by any of the CDs 1602, 1604, and 1606, regardless of being designated a talker or a listener. The SIP is an Internet engineering task force (IETF) defined application-layer protocol that describes control mechanisms to establish, modify, and terminate multimedia sessions operating over Internet protocol (IP). The SIP provides a general solution to call-signaling problems for Internet telephony applications by supporting mechanisms to register and locate users, mechanism which define user capabilities and describe media parameters, and mechanisms to determine user availability, call setup, and call-handling.

In one embodiment, SIP channel 1610 is used to start and end participation of a CD within the group 1600. A session description protocol (SDP) signal may also be used within SIP channel 1610. When the CD's participation within the group is setup, e.g., by using SIP channel 1610, real-time call control and signaling between the CD and the MCU takes place, e.g., by using NBS media signaling channel 1612. In one embodiment, media signaling channel 1612 is used to handle push-to-talk requests and releases, arbitrate between conflicting requests, or floor control, announce the beginning and end of information transmission, manage net dormancy, track endpoint connectivity, request and exchange net status, and notify any error messages. The protocol of media signaling channel 1612 minimizes the length of most common messages, and simplifies the task of interpreting replies and responding to requests while retaining flexibility for future enhancements. The protocol of media signaling channel 1612 also allows requests to be resent without adversely affecting protocol state.

In one embodiment, signaling traffic on media signaling channel 1612 includes call setup and control signaling, which may consist of session invitation requests and acknowledgements, and media signaling, which may comprise of real-time floor control requests and related asynchronous messages. Media traffic on the media traffic channel 1614 may comprise of real-time point-to-multi-point voice and/or data broadcasts. Both messaging categories have unique functional attributes. In addition, each CD may issue domain name service (DNS) client requests to facilitate mapping fully qualified DNS hostnames to Internet network addresses.

In one embodiment, the call-setup and call-control signaling is performed according to SIP semantics. Although SIP may be transported using either the well-known user datagram protocol (UDP) or transmission control protocol (TCP), in one embodiment, each CD performs SIP based signaling functions using UDP. Also, each CM may expect to receive SIP signaling requests via UDP. Real-time signaling may occur via dynamic UDP/IP interface on the CM and each CD. Other signaling may take place via a fixed TCP/IP interface between the CM and the CD using the SIP, for example.

PTT Latency

In one embodiment, when the packet data service is active, resources in the infrastructure, e.g., base station transceiver subsystem (BTS), base station controller (BSC), interworking (IWF), and the radio link are actively assigned to the mobile station (MS). In an IP-based VoIP dispatch service, while there is an active conversation going on between group participants, the packet data connection for each user remains active. However, after a period of inactivity, i.e., "hang time," in the group communications the user traffic channels may transition to the dormant state.

The transition to the dormant state conserves system capacity, reduces service cost and battery drain, and makes the user available to receive incoming conventional voice calls. For example, when the user is in an active packet data call, he will generally be considered to be "busy" to incoming voice calls. If the user's packet data call is in the dormant state, the user may be able to receive incoming voice calls. For these reasons, it is desirable to transition the packet data call to the dormant state after periods of packet data inactivity.

While packet data calls are active, even if no data packets are being exchanged, radio frequency (RF) energy may still be transmitted by the mobile phones, albeit at a low level, to maintain synchronization and power control with the base station. These transmissions may cause a significant power drain on the phone. In the dormant state, however, the phone may not perform any RF transmission. To conserve phone power and extend battery life, the hang time may be set to transition the phone to dormant mode after extended periods of no data transmission.

While the packet data service is active for all users, PTT requests, which may be IP datagrams sent between the MS and the dispatch server, have very low latency. However, if the user channels have previously transitioned to the dormant state, the PTT latency may be much longer. During packet data dormancy, state information associated with the packet data session, including the mobile IP address, may be maintained. However, state information associated with layers below PPP, such as the physical traffic layers, may be released and/or de-allocated.

In some infrastructures, to wake up a dormant data connection, the traffic channel must be reallocated, the resources must be reassigned, and the radio link protocol (RLP) layer must be reinitialized. The effect of this is that after a talk group has not talked for a while, when a user presses his PTT button to request the floor, the PTT latency for the first talk spurt is generally much longer than for subsequent talk spurts. While this is relatively infrequent, it can affect the utility of the service, and should be minimized.

To reduce the PTT latency, in one embodiment, the group call signaling, such as the floor-control requests, floor-control responses, and dormancy wakeup messages, may be transmitted on some available common channels, without waiting for dedicated traffic channels to be re-established. Such common channels may be always available, regardless of the state of the mobiles, and may not require being requested and reassigned each time a user wishes to initiate a group call. Therefore, the group call signaling may be exchanged even when mobiles are dormant, which may provide a means to re-establish dedicated traffic channels for the talker and listener mobiles in parallel.

In one embodiment, the calling mobile may send a floor-control request to the wireless infrastructure over some available reverse common channels, such as reverse access channel and reverse enhanced access channel. The calling mobile may also receive a response to the floor-control request on some available forward common channels, such as forward paging channel and forward common control channel. In one embodiment, the dormant listener mobiles may receive dormancy wakeup messages on some available forward common channels, such as forward paging channel and forward common control channel.

Short Data Burst Call-Signaling Messages

In one embodiment, a significant reduction in the actual total dormancy wakeup time and the PTT latency perceived by the talker, may be achieved through the use of the short data burst (SDB) messages, as provided in "TIA/EIA/IS-2000 Standards for cdma2000 Spread Spectrum Systems," hereinafter referred to as "the cdma2000 standard," for example. In one embodiment, SDB messages may be sent over both dedicated physical channels, such as the forward fundamental channel (FCH) or forward dedicated common control channel (F-DCCH), or common physical channels, such as the reverse access channel (R-ACH), reverse enhanced access channel (R-EACH), forward common control channel (F-CCCH), or paging channel (PCH). SDB messages may be transported by radio burst protocol (RBP), which maps the messages onto an appropriate and available physical layer channel. Because SDB messages may carry arbitrary IP traffic and may be sent over common physical channels, SDB messages provide a mechanism to exchange group call signaling when a calling client's mobile has no dedicated traffic channels.

Mobile-Originated Call-Signaling Messages

In one embodiment, media-signaling messages may carry IP datagrams over the reverse link or mobile-originated link. A client mobile station may signal the MCU quickly whenever the user requests the floor and a dedicated reverse traffic channel is not immediately available. Assuming the client mobile station has released all dedicated traffic channels, the client mobile station may immediately forward the floor-control request over a reverse common channel of a wireless infrastructure, which may relay the request to the MCU. For example, either the reverse access channel or the reverse enhanced access channel may be used to send such messages when a dedicated reverse channel is not available. In one embodiment, the client mobile station may transmit a floor-request message to the MCU as an SDB Message.

Referring to FIG. 4, in one embodiment, the client MS may send the PTT floor request 404 over a reverse common channel, such as the access channel or enhanced access channel, before attempting to re-establish its dedicated traffic channel. In one embodiment, the client MS may send the PTT floor request 404 in a SDB message regardless of what channel is used.

The client MS may then start re-establishing its dedicated traffic channel, e.g., by performing the "service option 33 re-origination," for example. The client MS may also start radio link protocol (RLP) synchronization. In one embodiment, the client MS may re-establish its dedicated traffic channel and synchronize RLP advantageously in parallel with sending the PTT floor request 404.

Therefore, use of the available reverse common channels and/or SDB feature to signal floor-control requests to the CM, when a mobile station does not have active dedicated traffic channels, reduces the total time required to wake up the participating mobiles. Although the talker client may not receive confirmation that its floor-request has been granted until the talker's forward traffic channel is re-established, the ability to quickly signal the CM to begin waking up participating listeners reduces the overall latency.

Referring to FIG. 4, the wireless infrastructure may send the PTT floor-control request 404 to packet data service node (PDSN) and then to the MCU. In one embodiment, after receiving the floor-control request, the MCU may arbitrate the request, burst media signaling wakeup messages (triggers) to a group of target participants (listeners), and/or trigger the re-establishment of participants' (listeners') traffic channels 414. If the MCU grants the PTT floor request, the MCU may send PTT floor grant 408 to the client MS. In one embodiment, the RD may send PTT floor grant 408 to the client MS on an available forward common channel, such as forward paging channel and forward common control channel, if the client's dedicated traffic channel is not re-established yet. In one embodiment, the infrastructure may send PTT floor grant 408 to the client MS in SDB form regardless of what channel is used.

In one embodiment, the MCU may wait for dormancy response timer to expire before responding to the PTT floor-control request. If the group's dormancy response timer is set to zero, the CM may respond to the floor-control request immediately. In one embodiment, if the client MS has completed re-establishing its traffic channel and RLP synchronization, the client MS may stream media 416, which may have been buffered 412 in the client MS, to the MCU.

Network-Originated Call-Signaling Messages

In one embodiment, after receiving the floor-control request, the MCU may burst media signaling wakeup messages to a group of target participants (listeners) and trigger the re-establishment of participants' (listeners') traffic channels. If the group's dormancy response timer is set to zero, the MCU may respond to the floor control request immediately. In one embodiment, if the talker has began re-establishing its traffic channel immediately upon sending the PTT request, the caller's and listeners' traffic channels may be advantageously re-established in parallel.

Referring to FIG. 4, after the MCU receives PTT floor-control request, the MCU may send wakeup triggers 414 directed to target listeners. The MCU may determine whether a packet-data session exists for the target mobile, and forwards the trigger packet to the appropriate infrastructure element, e.g., a base station. The infrastructure may page each individual target MS to start re-establishing its dedicated traffic channel. The target MS may then start re-establishing its dedicated traffic channel, e.g., by performing the "service option 33 reorigination," for example. The target MS may also start radio link protocol (RLP) synchronization. In one embodiment, the target MSs may re-establish their dedicated traffic channels and synchronize their RLPs advantageously in parallel with same functions being performed by the client MS.

In one embodiment, after a target MS has completed re-establishing its dedicated traffic channel and synchronizing its RLP, the target MS may send the wakeup reply 422 to the MCU, indicating that the target MS is ready to receive media. The MCU may send a talker announcement to the client MS before streaming media 420, which may have been buffered 418 in the MCU, to the target MS.

In one embodiment, the MCU may send the wakeup trigger 414 to a target listener over some available common forward channels, such as forward paging channel and forward common control channel, while the target listeners' traffic channels are not re-established yet. In one embodiment, the MCU may send the wakeup trigger 414 to the target listener in SDB form, regardless of what channel is used. If the PTT floor-control request is sent on the talker's reverse common channel as a SDB message and the target group's dormancy response timer is set to zero at the MCU, actual PTT latency at the talker client may be reduced to the time required to send an SDB request message on the reverse link followed by a SDB response message on the forward link.

Network Interfaces for Call-Signaling Messages

To determine what network-originated specific traffic, e.g., SDB payload, is sent for an idle mobile station with no dedicated traffic channels, some infrastructure policy or interface for distinguishing such specific traffic from other traffic may be implemented.

In a first embodiment, IP datagrams may be filtered based on their sizes, as the SDB messages may carry a limited user payload. IP datagrams smaller than a predetermined size limit may be sent as SDB message, if destined for a mobile with no dedicated traffic channels. The group communication system may use such filters, as the application floor-request response message is quite small, e.g., 34 bytes including the IP headers.

In a second embodiment, an infrastructure vendor may define an IP-based service for encapsulating IP traffic destined for delivery to a mobile station. An IP server with knowledge of this service may transmit small IP, e.g., UDP, datagrams, appropriately encapsulated with IP headers, to this service for delivery to a mobile suspected of not having a dedicated traffic channel. The group communication systems may use this service to indicate to the infrastructure that the floor-request response message be delivered to the requesting client MS in SDB form, for example. Coordination of SDB traffic with pending pages or service origination requests is also important to insure quick and reliable delivery of user traffic.

In a third embodiment, an IP server may transmit special IP, e.g., UDP, datagrams with IP headers for delivery to a mobile suspected of not having a dedicated traffic channel. The IP server may tag the IP datagrams, e.g., by designating a special value in the IP header, for instructing the infrastructure to deliver the IP datagrams to the client MS. The group communication systems may use this service to indicate to the infrastructure that the floor-request response message be delivered to the requesting client MS in SDB form, for example. In a third embodiment, a UDP or TCP port range may be reserved for delivering specific IP datagrams, e.g., SDB messages.

Mobile-Initiated Service Origination and Paging

In one embodiment, a client may send the floor-control request 404, which may be in SDB form, followed immediately with a service origination request to the wireless, e.g., CDMA, infrastructure for quickly re-establishing its traffic channels. However, if the dormancy response timer is set to a small value, the RD may respond to the floor-control request quickly and transmit a response 408 back to the client. If this response arrives at the infrastructure during the early phases of the service origination transaction, the infrastructure notes that the talker MS does not have any active traffic channel and may attempt to page the response to the talker MS. However, this paging action may abort the service origination transaction already in progress. In one embodiment, the talker MS may respond to the page, insuring that the floor-control response message is delivered to the talker, and request service origination again, but an unnecessary delay is experienced in re-establishing the talker's traffic channel as a result of the aborted original service origination attempt.

In a first embodiment, to avoid the race condition between the service origination process and paging, the RD may be configured to not respond immediately to the floor-control request 404. Accordingly, the dormancy response timer may be adjusted so that the MCU transmits the response 408 to the talker MS after the service origination process is complete.

In a second embodiment, the PDSN, which receives the response 408, and the mobile switching center (MSC), which responds to the talker's service origination request, are coordinated. That is, if the PDSN determines that a packet-data service origination process for the talker MS is already in progress when response 408 arrives at the infrastructure, the MSC may defer paging the talker MS. The PDSN may cache the response and send it over the talker mobile's forward traffic channel once the service origination process is complete. Alternatively, the MSC may send the response to the talker MS as an SDB message if the service origination process is still in progress.

In a third embodiment, the talker MS may avoid the race condition by not issuing a service origination request until after the talker MS has received a response to the floor-control request. In one embodiment, since the talker MS has no active dedicated traffic channel, the MCU may send the response to the talker MS on some available forward common channels, such as forward paging channel and forward common control channel. In one embodiment, the MCU may send the response to the talker MS in SDB form. The talker MS may rely on the RD-generated floor-control response to trigger its traffic channel re-activation, in the same fashion that the wakeup requests sent by the MCU trigger traffic channel re-activation for the listener mobiles. The race condition is avoided as the potential for simultaneous mobile-initiated service origination and network-initiated paging of the mobile is avoided.

Caching Network-initiated Packet Data Triggers

The IP datagram, including the wakeup trigger 414, that arrives at the wireless, e.g., CDMA, infrastructure and is destined for a listener mobile that has no dedicated traffic channels may be lost, either by the network in general or by the wireless infrastructure specifically. In one embodiment, the wakeup trigger 414 sent to the listener mobile is retransmitted aggressively according to a defined schedule until the listeners respond or the group's wakeup timer expires.

For example, the wakeup trigger 414 may be resent every 500 ms. However, re-transmitting the wakeup triggers 414 at this rate may cause a maximum delay of up to 500 ms, or an average delay of 250 ms, from the time a listener's traffic channel is re-established to the time next wakeup trigger destined for that listener arrives at the infrastructure.

In one embodiment, the infrastructure or another entity in the network may cache the wakeup trigger 414 sent by the MCU, and deliver it to a target MS as soon as the target MS has re-established its traffic channel. This eliminates the need for retransmission of wakeup request by the MCU, and reduces total dormancy wakeup time. Cashing the wakeup trigger 414, as opposed to re-transmitting it at the rate of 500 ms, for example, may eliminate a delay of up to 500 ms. from the total dormancy wakeup time.

Media Buffering

In one embodiment, the user may be allowed to start talking after the user has requested floor control, by buffering the media before dedicated channels are re-established between the client and the listeners. By buffering the talker's speech, the system allows the talker to start talking before the listeners' traffic channels have been fully re-established. This allows the talker to start talking earlier, reducing his apparent PTT latency. Since listeners don't experience PTF latency, their experience is unaffected, i.e., the PTT latency is shifted from the talker to other parts of the system. The talker may wait just as long to receive a response from a listener to his first talk spurt, but as mentioned previously, he already expects the response to his first talk spurt to take longer than the response to subsequent talk spurts that occur while he is engaged in an active conversation. Buffering of the talker's first talk spurt can be done on the MCU side or on the client MS side.

MCU-Side Buffering

Figure 17:
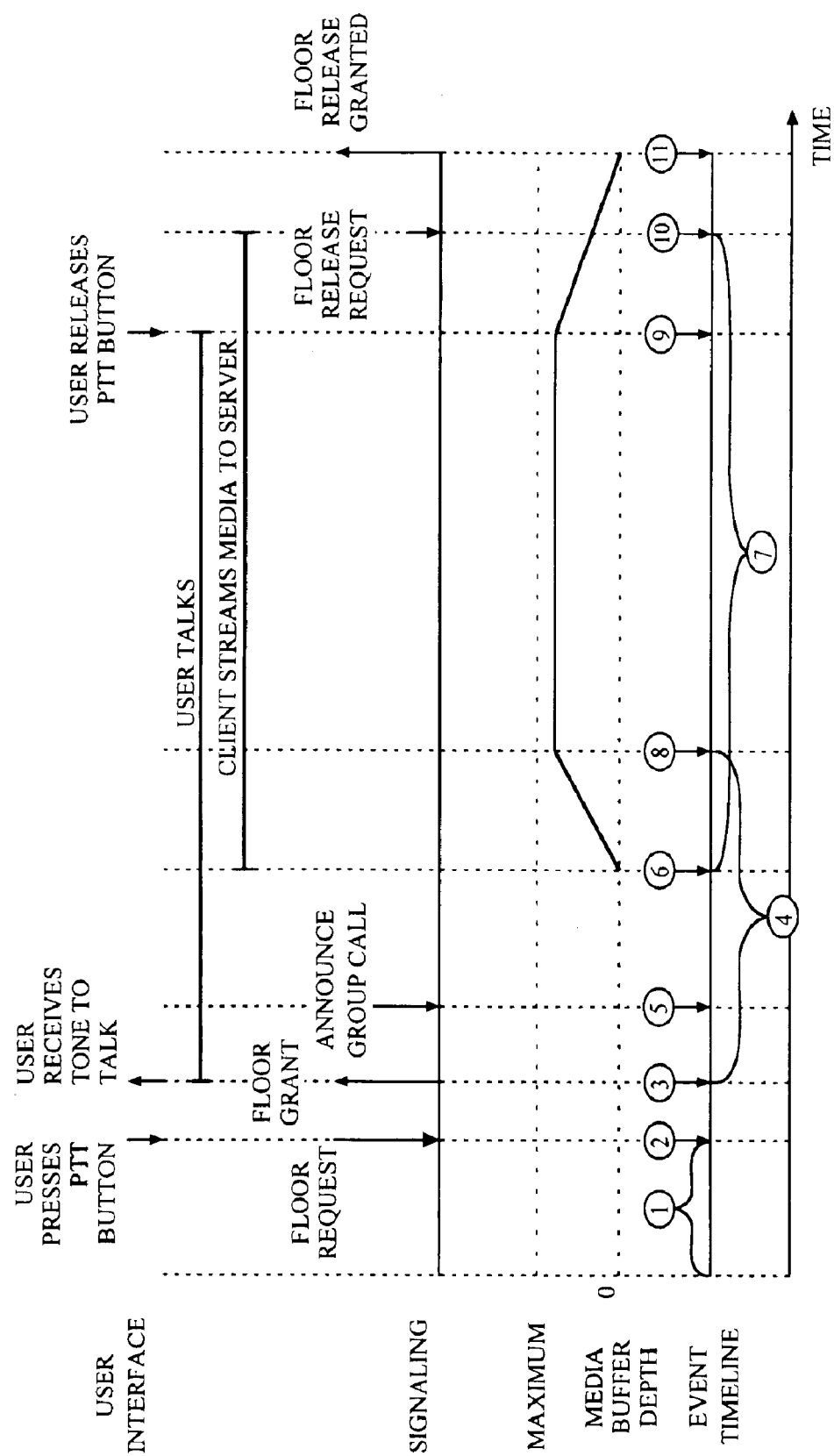
FIG. 17 illustrates buffering media at a communications manager side according to one embodiment.

In one embodiment, the MCU may buffer the talker's first talk spurt. After a user has pressed his PTT button and the user's traffic channels are re-established, he may be allowed to communicate with the MCU. At this time, since the listener traffic channels are not yet up, the MCU buffers 418 the talker's speech for future transmission to the target listeners. MCU buffering may reduce the apparent PTT latency that the talker sees to the approximate time it takes to bring up the talker's traffic channel. FIG. 17 shows MCU-Side buffering according to one embodiment, as described below:

(1) No call in progress, originator and target's traffic channels are dormant.

(2) Users presses the PIT button. Server receives a "setup group call" request from the client.

(3) Floor is granted to the user after the client receives "setup in progress" response from the server or after a configurable delay (1 second) and begins buffering user media.

(4) Server begins process of re-establishing packet data traffic channels of the targets.

(5) Server sends "group call announcement" message to the client via SDB.

(6) Client successfully re-establishes traffic channel, starts sending buffered media to the server.

(7) Client streams media to the server.

(8) Targets' traffic channels have been re-established ("target response threshold" is met).

(9) User releases the PIT button. Client stops buffering media.

(10) Client finishes streaming buffered media to server, requests release of the floor by the server.

(11) Server sends floor release acknowledgement to the client.

Client-Side Buffering

Figure 18:
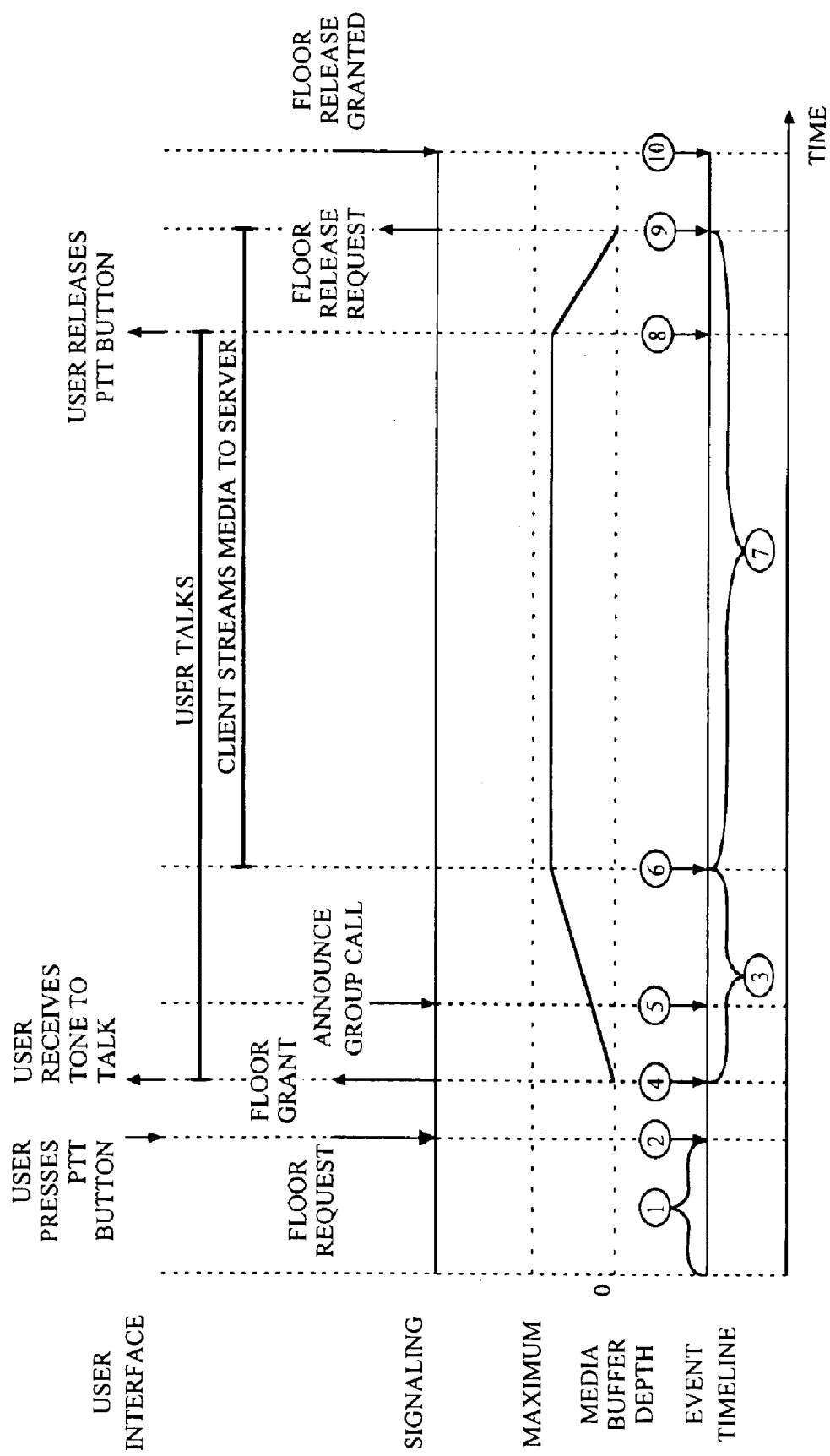
FIG. 18 illustrates buffering media at a client side according to one embodiment.

In one embodiment, where a shorter apparent latency is desired, the talker may be allowed to begin speaking before even his traffic channel is re-established. Because the client MS is not yet in communication with the MCU, the signal to the talker to begin talking is made by the client MS. If the talker is allowed to speak before the talker's traffic channel is re-established, the client MS may buffer 412 the speech. Because communication with the CM has not yet been established, permission to talk is being given "optimistically." FIG. 18 shows client-side buffering according to one embodiment, as described below:

(1) No call in progress, originator's traffic channel is dormant.

(2) User presses the PIT button. Client sends a "setup group call" request to server via SDB.

(3) Client begins process of re-establishing a packet data traffic channel.

(4) Floor is granted to the user after the client receives "setup in progress" response from the server or after a configurable delay (1 second) and begins buffering user media.

(5) Client receives "group call announcement" message from the server via SDB.

(6) Client successfully re-establishes traffic channel.

(7) Client streams buffered media to server.

(8) User releases the PTT button. Client stops buffering media.

(9) Client finishes streaming buffered media to server, requests release of the floor by the server.

(10) Client receives acknowledgement of floor release from the server.

In one embodiment, both MCU buffering 418 and client-side buffering 412 may operate concurrently. Client-side buffering may allow the apparent PTT latency to be small. In one embodiment, the client MS may buffer media to control the apparent PTT latency experienced by the user. The combination of mobile-originated SDB and client-side media buffering may reduce the delays associated with re-establishing active traffic channels.

Therefore, the disclosed embodiments provide for a dispatch model that supports at least two types of dispatch calls: the chat-room model and the ad-hoc model. In the chat-room model, the groups are pre-defined, which may be stored on the dispatch server. In the ad-hoc model, however, the groups may be defined and/or modified in real-time.

The disclosed embodiments also provides for a significant reduction in the actual total dormancy wakeup time and the PTT latency by exchanging group call signaling even when mobiles are dormant and no traffic channel is active. The method and apparatus provides for exchanging the group call signaling through the use of the short data burst (SDB) message signaling. The method and apparatus provides for re-establishing dedicated traffic channels for the talker mobile and the dormant listener mobiles advantageously in parallel.

In another embodiment, the dormant-wakeup latency in a group communication network may be reduced through caching the network-initiated wakeup triggers destined for target listeners, and delivering a wakeup trigger to a target mobile station as soon as the target mobile station has re-established its traffic channel.

In another embodiment, simultaneous service origination and paging in a mobile operating in a group communication network is avoided by transmitting a response to a floor-control request after the service origination process is complete. In one embodiment, the response to the floor-control request may be in SDB form if the service origination process is not complete. In another embodiment, the service origination process for the source communication device is initiated after transmitting the response to the source communication device.

What is claimed is:

1. In a communication device, a method for adding a user to a group call in a group communication network, the method comprising:

receiving an indication from a user who wishes to initiate a group call;

sending a request to a server to initiate the group call or add the user to the group call if the group call is already in progress;

receiving a response from the server indicating that the group call is in progress;

alerting the user of being added to the group call; and receiving media from the server after a traffic channel is re-established, wherein the traffic channel is re-established simultaneously with said sending the request.

2. The method of claim 1, wherein said sending includes transmitting the request on a reverse access channel (R-ACH) of a wireless network.

3. The method of claim 1, wherein said sending includes transmitting the request on a reverse enhanced access channel (R-EACH) of a wireless network.

4. The method of claim 1, further including renegotiating a radio link protocol (RLP) for the communication device.

5. The method of claim 1, further including renegotiating a radio link protocol (RLP) for the communication device simultaneously with said sending the request.

6. The method of claim 1, wherein said sending includes transmitting the request in short data burst (SDB) form.

7. In a communication device, a computer-readable medium embodying a method for adding a user to a group call in a group communication network, the method comprising:

receiving an indication from a user who wishes to initiate a group call;

sending a request to a server to initiate the group call or add the user to the group call if the group call is already in progress;

receiving a response from the server indicating that the group call is in progress;

alerting the user of being added to the group call; and receiving media from the server after a traffic channel is re-established, wherein the traffic channel is re-established simultaneously with said sending the request.

8. The computer-readable medium of claim 7, wherein said sending includes transmitting the request on a reverse access channel (R-ACH) of a wireless network.

9. The computer-readable medium of claim 7, wherein said sending includes transmitting the request on a reverse enhanced access channel (R-EACH) of a wireless network.

10. The computer-readable medium of claim 7, wherein said method further includes renegotiating a radio link protocol (RLP) for the communication device.

11. The computer-readable medium of claim 7, wherein said method further includes renegotiating a radio link protocol (RLP) for the communication device simultaneously with said transmitting the request.

12. The computer-readable medium of claim 7, wherein said sending includes transmitting the request in short data burst (SDB) form.

13. A communication device for adding a user to a group call in a group communication network, comprising:

means for receiving an indication from a user who wishes to initiate a group call;

means for sending a request to a server to initiate the group call or add the user to the group call if the group call is already in progress;

means for receiving a response from the server indicating that the group call is in progress;

means for alerting the user of being added to the group call; and means for receiving media from the server after a traffic channel is re-established, wherein the traffic channel is re-established simultaneously with said sending the request.

14. The communication device of claim 13, wherein said means for sending includes means for transmitting the request on a reverse access channel (R-ACH) of a wireless network.

15. The communication device of claim 13, wherein said means for sending includes means for transmitting the request on a reverse enhanced access channel (R-EACH) of a wireless network.

16. The communication device of claim 13, further including means for renegotiating a radio link protocol (RLP) for the communication device.

17. The communication device of claim 13, further including means for renegotiating a radio link protocol (RLP) for the communication device simultaneously with said transmitting the request.

18. The communication device of claim 13, wherein said means for sending includes means for transmitting the request in short data burst (SDB) form.

19. A communication device for adding a user to a group call in a group communication network, comprising:

a receiver;

a transmitter; and a processor communicatively coupled to the receiver and the transmitter, the processor being capable of:

receiving an indication from a user who wishes to initiate a group call;

sending a request to a server to initiate the group call or add the user to the group call if the group call is already in progress;

receiving a response from the server indicating that the group call is in progress;

alerting the user of being added to the group call; and receiving media from the server after a traffic channel is re-established, wherein the traffic channel is re-established simultaneously with said sending the request.

20. The communication device of claim 19, the processor further being capable of transmitting the request on a reverse access channel (R-ACH) of a wireless network.

21. The communication device of claim 19, the processor further being capable of transmitting the request on a reverse enhanced access channel (R-EACH) of a wireless network.

22. The communication device of claim 19, the processor further being capable of renegotiating a radio link protocol (RLP) for the communication device.

23. The communication device of claim 19, the processor further being capable of renegotiating a radio link protocol (RLP) for the communication device simultaneously with said transmitting the request.

24. The communication device of claim 19, the processor further being capable of transmitting the request in short data burst (SDB) form.

* * * * *